United States Patent [19]

Iwakane et al.

[11] 4,259,628

[45] Mar. 31, 1981

[54] CONTROL DEVICE OF AC MOTOR

[75] Inventors: Takanobu Iwakane; Tohru Kai; Kenji Hirose; Koichiro Nakagawa, all of Kitakyushu, Japan

[73] Assignee: Kabushiki Kaisha Yaskawa Denki Seisakusho, Fukuoka, Japan

[21] Appl. No.: 933,914

[22] Filed: Aug. 15, 1978

[30] Foreign Application Priority Data

Aug. 17, 1977 [JP] Japan .................................. 52-98991
Aug. 17, 1977 [JP] Japan .................................. 52-98992
Nov. 14, 1977 [JP] Japan .................................. 52-153626
Nov. 17, 1977 [JP] Japan .................................. 52-155998
Mar. 3, 1978 [JP] Japan .................................. 53-24730

[51] Int. Cl.³ ........................... H02P 5/28; H02P 7/36
[52] U.S. Cl. .................................... 318/799; 318/808; 318/812
[58] Field of Search ............... 318/799, 807, 808, 812, 318/661

[56] References Cited

U.S. PATENT DOCUMENTS

| | | | |
|---|---|---|---|
| 3,824,437 | 7/1974 | Blaschke | 318/227 |
| 3,983,463 | 9/1976 | Nabae et al. | 318/227 |
| 4,078,192 | 3/1978 | Fultz | 318/799 |
| 4,091,294 | 5/1978 | Zankl et al. | 318/808 |

*Primary Examiner*—B. Dobeck
*Assistant Examiner*—Eugene S. Indyk
*Attorney, Agent, or Firm*—Fitzpatrick, Cella, Harper & Scinto

[57] ABSTRACT

In a control device of an AC motor wherein a torque equivalent to that of a DC motor is created by controlling the instantaneous values of its stator current, or in a vector control device, signals from a position detector such as a resolver coupled to the AC motor are utilized to form stator current instruction signals and to provide rotation position feed-back signals and rotation speed feed-back signals for the AC motor, thereby to perform precise servo-control.

4 Claims, 26 Drawing Figures

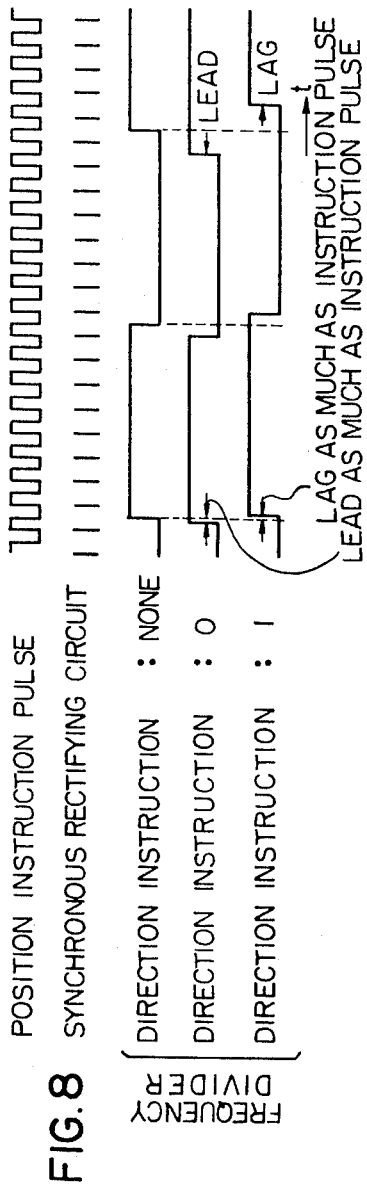
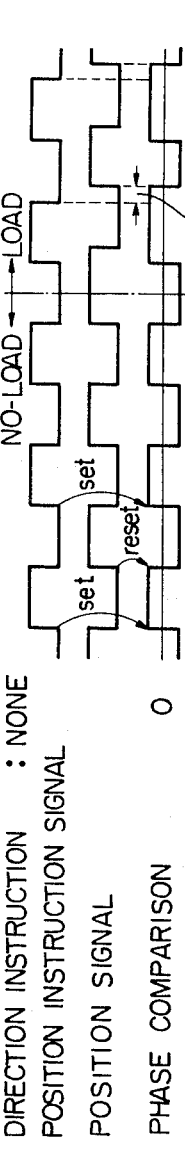
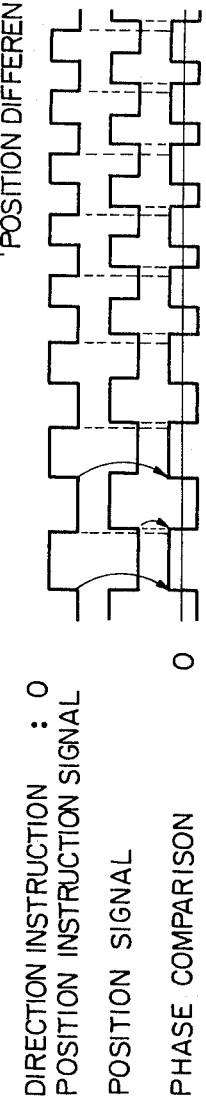
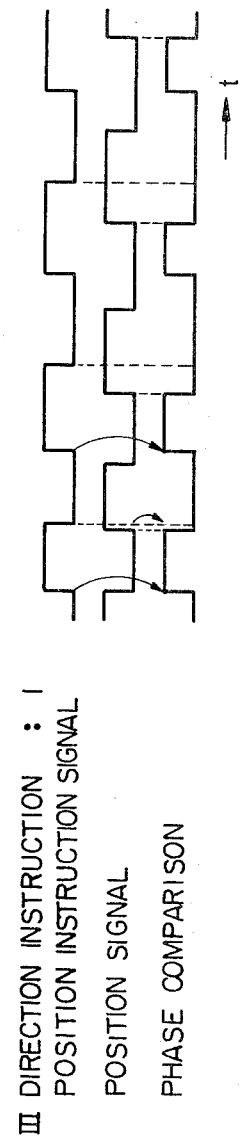

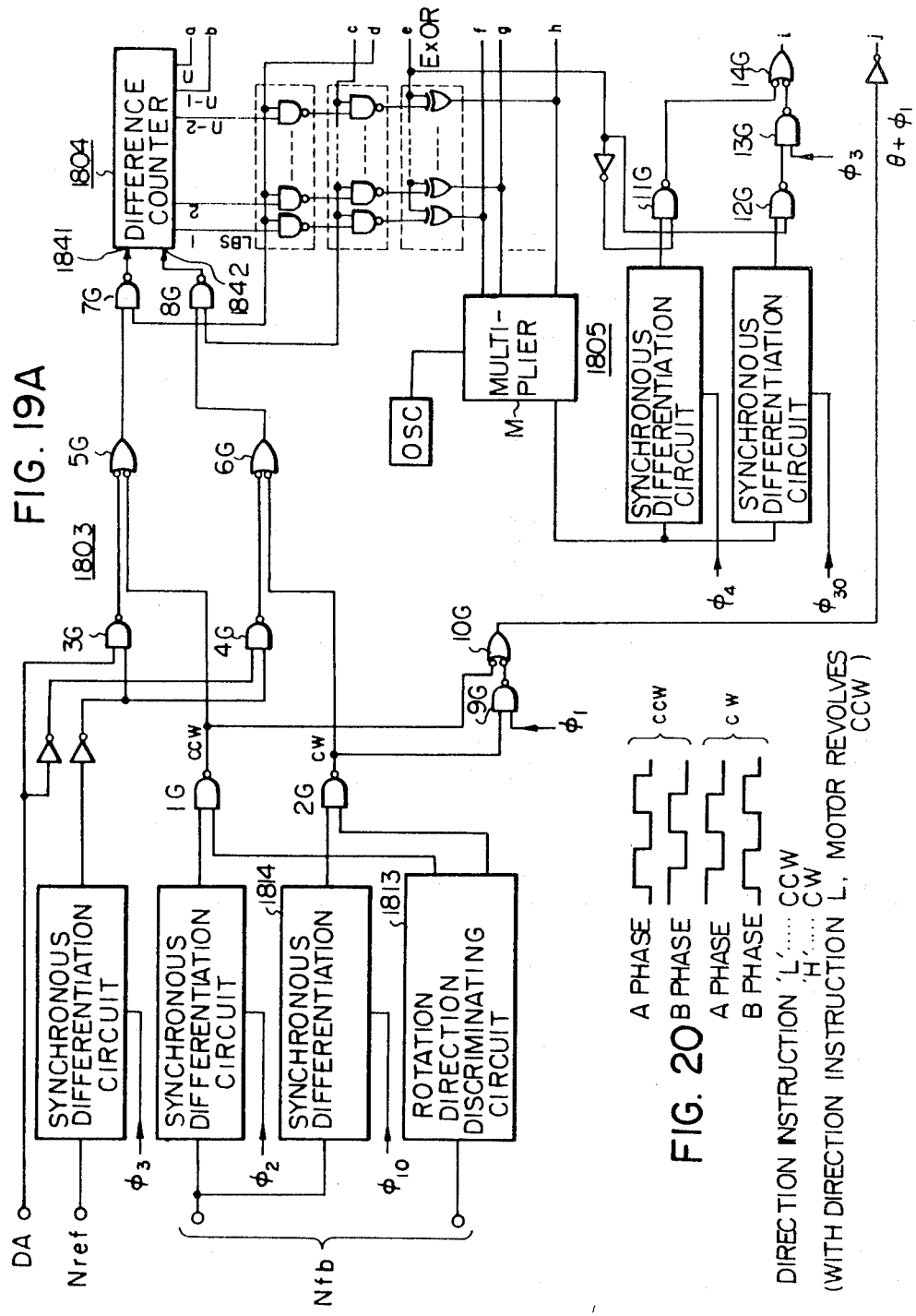

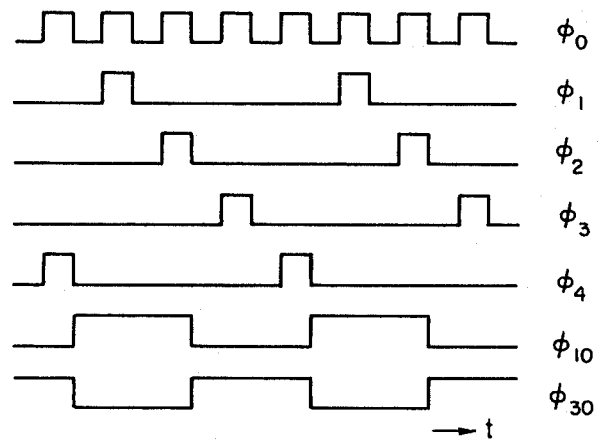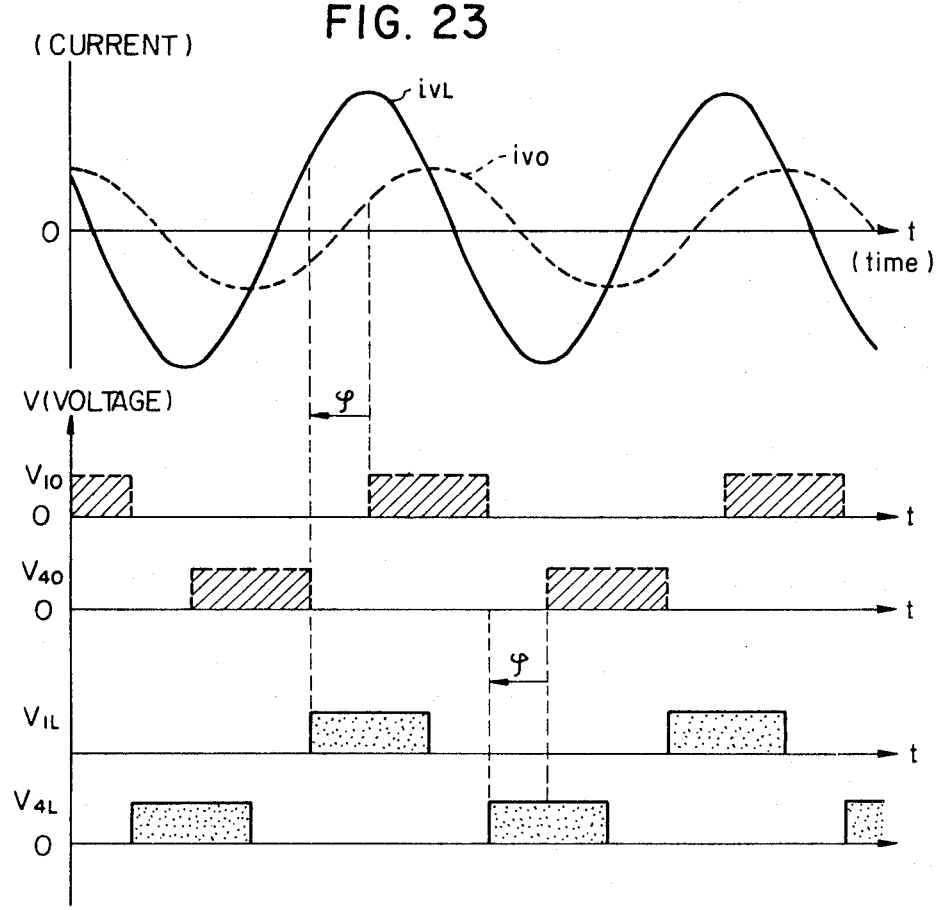

CONTROL DEVICE OF AC MOTOR

BACKGROUND OF THE INVENTION

This invention relates to a control device of an AC motor.

In general, a DC motor is extensively employed to drive a servo mechanism which should be controlled with high accuracy over a wide range, because precise speed control can be effected with the DC motor.

However, there has been a strong demand for provision of an AC servo mechanism which uses an induction motor as its driving source, because the induction motor can be readily handled. Heretofore, the speed control of the induction motor is carried out in accordance with a frequency conversion method or the like. However, the conventional methods relate to simple, variable speed control, and therefore cannot obtain driving characteristics with high accuracy. In addition, as for the self-speed-control of the induction motor, a magnetic field orientation control method has been proposed in the art, in which, similarly as in the control principle of a DC motor, spatial magnetic flux is controlled, in a vector mode, by using a slip frequency controlled or pulse width controlled inverter, thereby to drive the induction motor. That is, in this magnetic field orientation control method, the spatial magnetic flux vector calculation is effected to obtain magnetic instructions, and therefore the method requires provision of a vector's rotational position detecting section, a vector calculating section, and a magnetic flux control section. Accordingly, the method is necessarily intricate, and is not practice in the field of small capacity motors.

SUMMARY OF THE INVENTION

Accordingly, a first object of this invention is to provide a control device of an AC motor which performs vector control to provide a torque equivalent to that of a DC motor by controlling the instantaneous values of stator current in the AC motor, in which signals from a brushless and high-temperature-resisting position detector such as a resolver or a pulse generator coupled to the AC motor are employed for generating instruction signals for the stator current and are employed also for providing rotation position feed-back signals and rotation speed feed-back signals for the AC motor, thereby to carry out precise servo control.

A second object of the invention is to provide a device in which a current instruction signal and a position signal obtained by subjecting the signal of a resolver coupled to a synchronous motor to frequency division, and a speed feed-back signal obtained by subjecting the signal of the resolver to frequency-to-voltage conversion are taken out, so that an AC frequency and current supplied to the synchronous motor are controlled by these three signals.

A third object of the invention is to provide a device in which, in conjunction with the second object, the phase of a position instruction pulse is compared with the phase of the position signal, thereby to calculate the alternate current to be supplied to the synchronous motor.

A fourth object of the invention is to provide a device in which, in conjunction with the second or third object, the detecting signal of the resolver is subjected to frequency division by a frequency division circuit, while the output of the exciting circuit of the resolver is also subjected to frequency division by another frequency division circuit, and the outputs of the two frequency division circuits are applied to two-phase beat generator to provide two-phase current instruction signal.

A fifth object of the invention is to provide a device in which two-phase sine wave signals obtained by utilizing a frequency division signal of the output voltage frequency of a resolver coupled to an induction motor and a signal which has the same carrier frequency as the frequency division signal and is subjected to digital phase modulation by a torque instruction of the induction motor are employed as exciting current instructions of the induction motor.

A sixth object of the invention is to provide a device in which, in conjunction with the first object, a rotation speed signal is simultaneously obtained from the detecting signal of the resolver which is utilized as a position control signal.

A seventh object of the invention is to provide a device in which, in conjunction with the sixth object, the rotation speed signal is obtained from the two-phase signals.

An eighth object of the invention is to provide a device, in which, in conjunction with the sixth object, the two-phase signals provided are converted into polyphase signals which are out of phase with one another by a predetermined angle, and the rotation speed signal is obtained from the polyphase signals.

A ninth object of the invention is to provide a device in which the AC motor described in the first object is subjected to digital servo control.

A tenth object of the invention is to provide a device in which, in conjunction with the ninth object, the waveform generator comprises a beat oscillator.

An eleventh object of the invention is to provide a device in which, in conjunction with the ninth object, the waveform generator comprises a memory circuit.

A twelfth object of the invention is to provide a device in which in conjunction with the first object wherein the driving is effected with square wave current of 120° electricity application, the primary current of the induction motor is transiently controlled.

The foregoing objects and other objects as well as the characteristic features of the invention will become more apparent from the following detailed description and the appended claims when read with reference to the accompanying drawings.

BRIEF DESCRIPTION OF THE DRAWINGS

In the accompanying drawings:

FIG. 8 and FIG. 9 are time charts for a description of the operation of a position loop;

FIGS. 19A and 19B are a concrete circuit diagram showing the fourth embodiment in more detail;

FIG. 20 is a waveform diagram including a feed-back pulse signal Nfb in the circuit shown in FIG. 19;

FIG. 21 is a waveform diagram indicating clock pulses employed in the circuit shown in FIG. 19;

FIG. 23 is a diagram for a description of the phase control effected in a fifth embodiment.

DETAILED DESCRIPTION OF THE INVENTION

A first embodiment of this invention relates to a high efficiency servo control system employing a synchronous motor.

In order to obtain control performance similar to that of a DC machine from a brushless AC machine, a variety of commutatorless motors have been proposed in the art. However, these motors are still disadvantageous in that it is necessary to separately provide a distributor for obtaining an exciting current distribution signal and a tachometer generator for obtaining a speed feed-back signal for the purpose of self-control operation, and the construction is necessarily intricate. There has been a strong demand for eliminating this difficulty.

In this first embodiment, only one detector is employed to obtain not only the aforementioned current distribution signal and speed feedback signal but also a position signal for position control, forming a precise servo control system.

Figure 1:
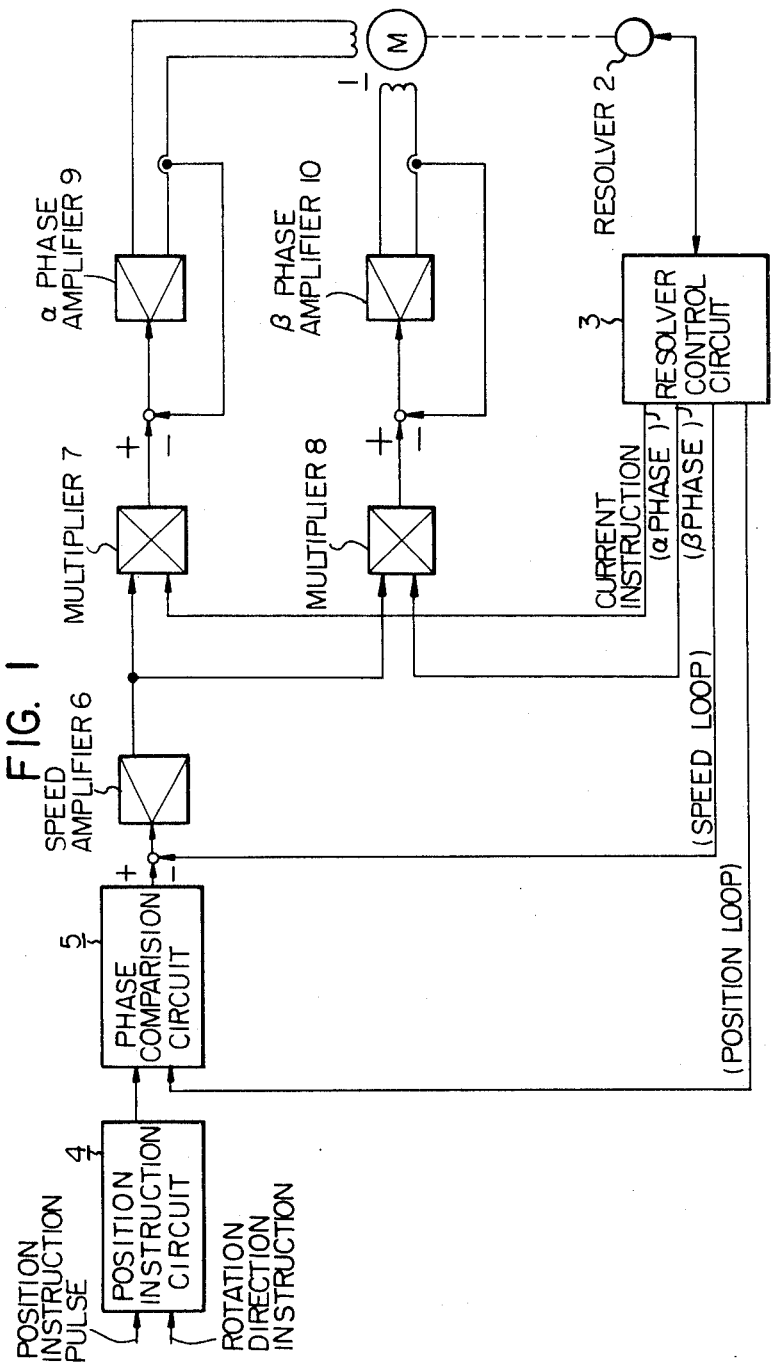
FIG. 1 is a block diagram showing a first embodiment of this invention.

Referring to FIG. 1, reference numeral 1 designates a synchronous motor; reference numeral 2, a resolver coupled to the synchronous motor 1; reference numeral 3, a resolver control circuit; reference numeral 4, a position instruction circuit; reference numeral 5, a phase comparison circuit; reference numeral 6, a speed amplifier; reference numerals 7 and 8, multipliers; and reference numerals 9 and 10, an $\alpha$ phase amplifier and a $\beta$ phase amplifier.

Figure 2:
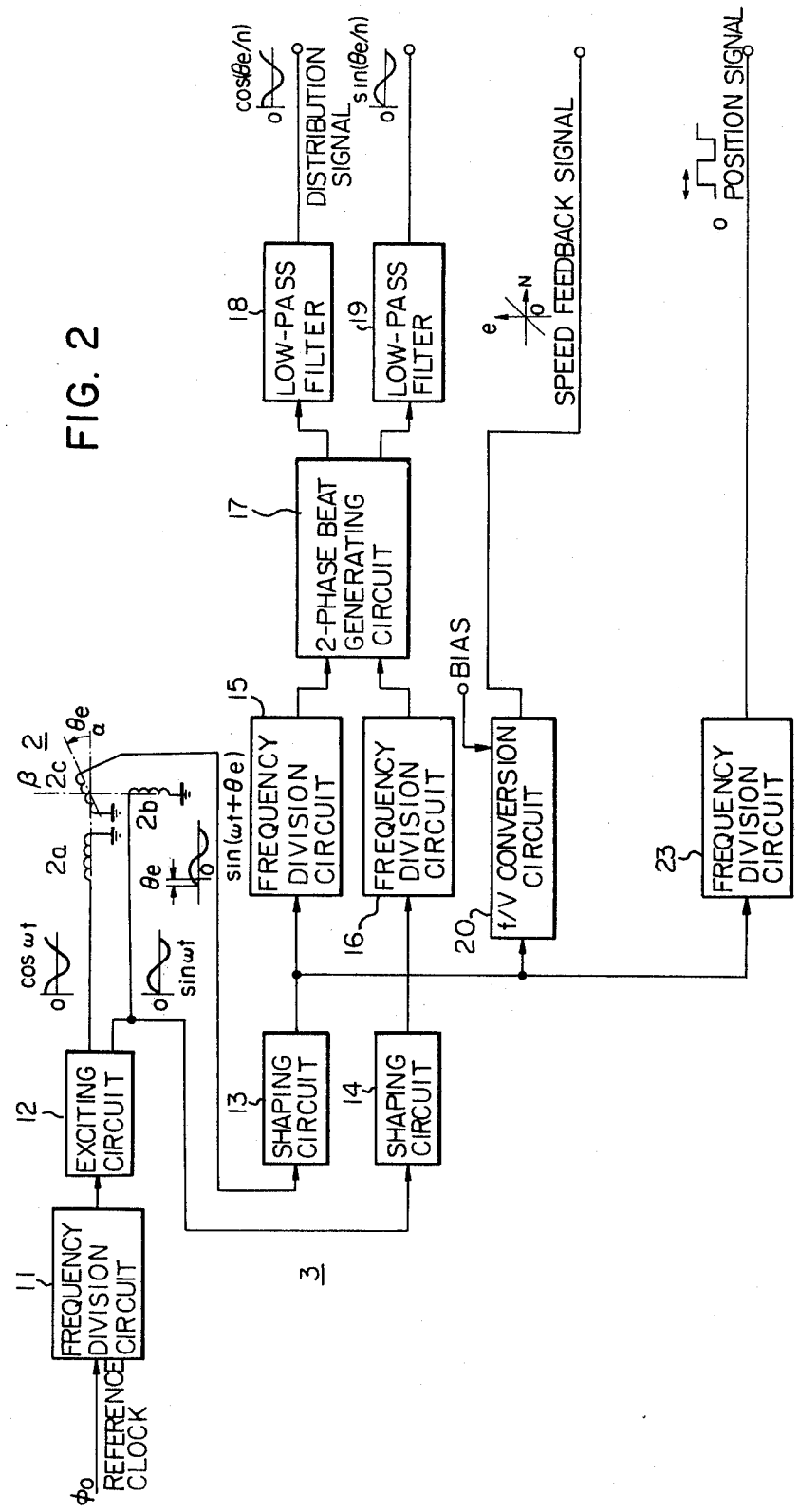
FIG. 2 is a block diagram illustrating a resolver control circuit shown in FIG. 1.

A circuit shown in FIG. 2 comprises: a frequency division circuit 11; an exciting circuit 12; shaping circuits 13 and 14; frequency division circuits 15 and 16, a 2-phase beat generating circuit 17; low-pass filters 18 and 19; f/v conversion circuits 20 and 21; a differential amplifier 22; and a frequency division circuit 23.

In the circuit in FIG. 2, a reference clock signal $\phi_0$ is subjected to frequency division by the frequency division circuit 11 to obtain a suitable frequency, and two-phase sine wave signals cos $\omega t$ and sin $\omega t$ (which may be replaced by triangular wave signals) in synchronization with the frequency are formed by the exciting circuit 12. The two-phase sine wave signals thus formed are applied through a power booster (not shown) to exciting windings 2a and 2b of the resolver 2 wound at a position different by 90° in electrical angle. A phase modulation signal (for instance, sin $(\omega t + \theta_e)$ where $\omega$ is the exciting angular frequency) corresponding to a rotation angle $\theta_e$ of the rotor is generated in a detecting winding 2c of the resolver 2. If a carrier component (the resolver's exciting frequency) is removed from this phase modulation signal, signals (sin $\theta_e$, cos $\theta_e$) corresponding to the electrical angle $\theta_e$ of the rotor can be obtained. In this case, the synchronous motor 1 has two phase windings, namely, an $\alpha$ phase winding and a $\beta$ phase winding. In order to make the torque generating principle equivalent to that of a DC machine, it is necessary to make the direction of the synthesized magnetomotive force of the phases ($\alpha$ phase and $\beta$ phase) of the armature perpendicular to the magnetic pole direction of the rotary field system. Accordingly, the phase of a current instruction should be controlled so as to meet this requirement.

Figure 3:
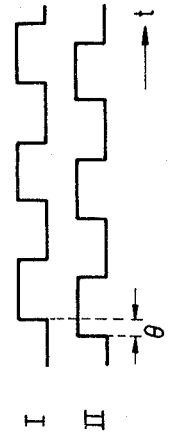
FIG. 3 is a vector diagram for a description of the operation of a synchronous motor.

As indicated in a vector diagram in FIG. 3, when the phase of the field system magnetic flux $\Phi$ is represented by a value $\psi$, the $\alpha$ phase exciting current instruction and the $\beta$ phase exciting current instruction of the armature winding can be expressed by ia cos $\psi$ and $-$ia sin $\psi$ respectively. If the number of poles of the resolver 2 is equal to that of the synchronous motor 1, then cos $\theta_e$ and sin $\theta_e$ correspond cos $\psi$ and sin $\psi$, respectively, and therefore if the relative position of the resolver and the motor is mechanically adjusted, the optimum current instruction can be given. If the resolver 2 is of the multiple poles, a frequency division ratio for effecting frequency division with suitable timing is determined by a ratio of the number of poles of the resolver to the number of poles of the motor. However, in practice, the detection signal of the resolver 2 is subjected to waveform shaping by the shaping circuit 13 and to 1/n frequency division by the frequency division circuit 15; and on the other hand the output sin $\omega t$ of the exciting circuit 12 is subjected to waveform shaping by the shaping circuit 14 and to frequency division by the frequency division circuit 16. The outputs of the two frequency division circuits 15 and 16 are applied to the 2-phase beat generating circuit 17 so as to obtain two-phase beat waves, which are applied to the low pass filters 18 and 19, respectively, to obtain distribution signals (current instruction signals) cos $(\theta_e/n)$ and sin $(\theta_e/n)$, respectively. The signal obtained by subjecting the detection signal of the resolver 2 to waveform shaping in the shaping circuit is applied also to the f/v conversion circuit 20, while the signal obtained by subjecting the output sin $\omega t$ of the two-phase exciting circuit 12 to waveform shaping in the shaping circuit 14 is applied also to the f/v conversion circuit 21. The outputs of the two f/v conversion circuits 20 and 21 are applied to the differential amplifier 22, which in turn outputs the speed feed-back signal of the resolver 2, that is, that of the synchronous motor 1.

Furthermore, the signal obtained by subjecting the detection signal of the resolver 2 to waveform shaping in the shaping circuit 13 is applied to the frequency division circuit 23.

Figure 4:
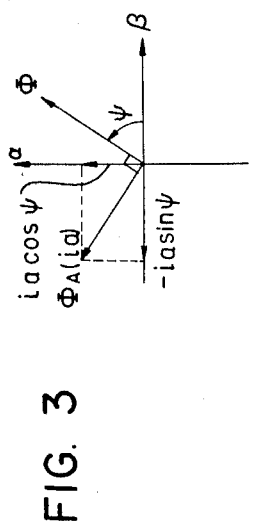
FIG. 4 is a waveform diagram for a description of the output of a resolver.

Originally, the resolver is a position detector, and the detection signal thereof therefore contains positional information. More specifically, where the rotor of the resolver 2 is at rest the output voltage (shaped by the shaping circuit 13) of the detecting winding 2c has a waveform I, but when the rotor is turned through a rotation angle θ, it has a waveform II where the phase is changed by θ, as indicated in FIG. 4. That is, the leading and lagging of phase depends on the direction in which the rotor turns. Utilization of this fact may form a position control loop with respect to a feed-back signal in a PLL (phase locked loop). The frequency division circuit 23 is to determine the locking range of the PLL according to the response characteristic of the control system. If the resolver 2 has 100 poles, when it turns through 72° in mechanical angle, its phase is changed by 360° in electrical angle. Therefore, if the system's response is slow, then it is difficult to effect the locking.

Figure 5:
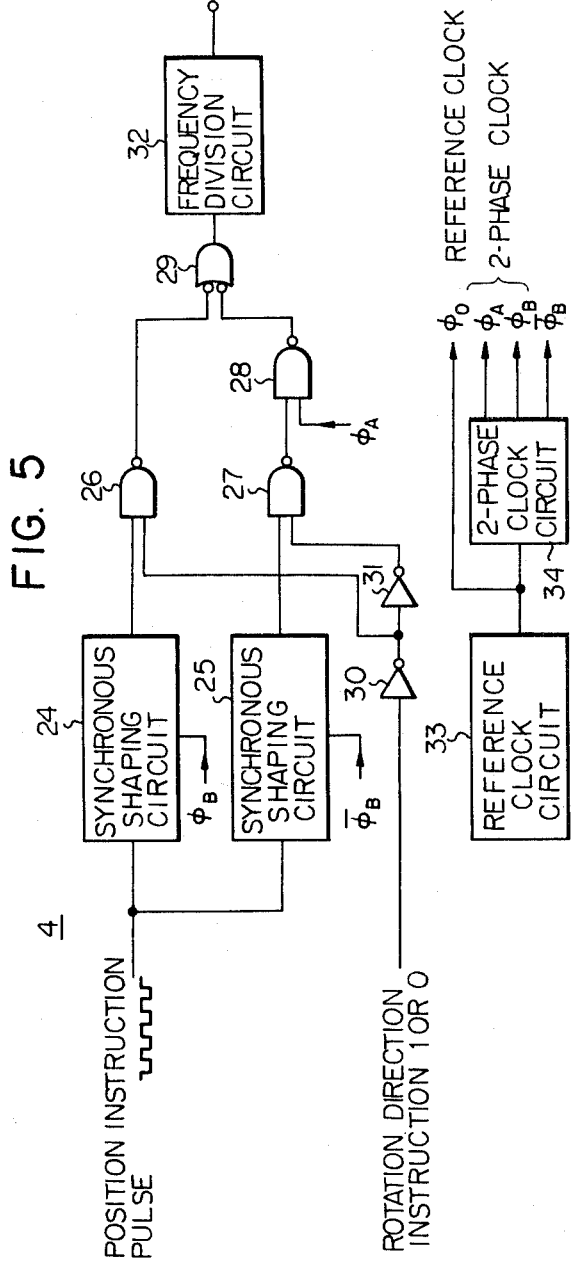
FIG. 5 is a block diagram showing a position instruction circuit in FIG. 1.
Figure 6:
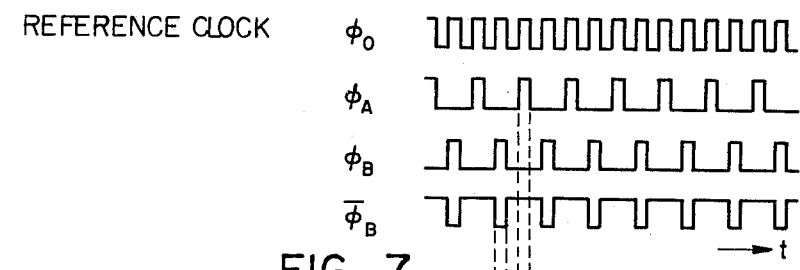
FIG. 6 is a waveform diagram indicating clock pulses supplied to the position instruction circuit.
Figure 7:
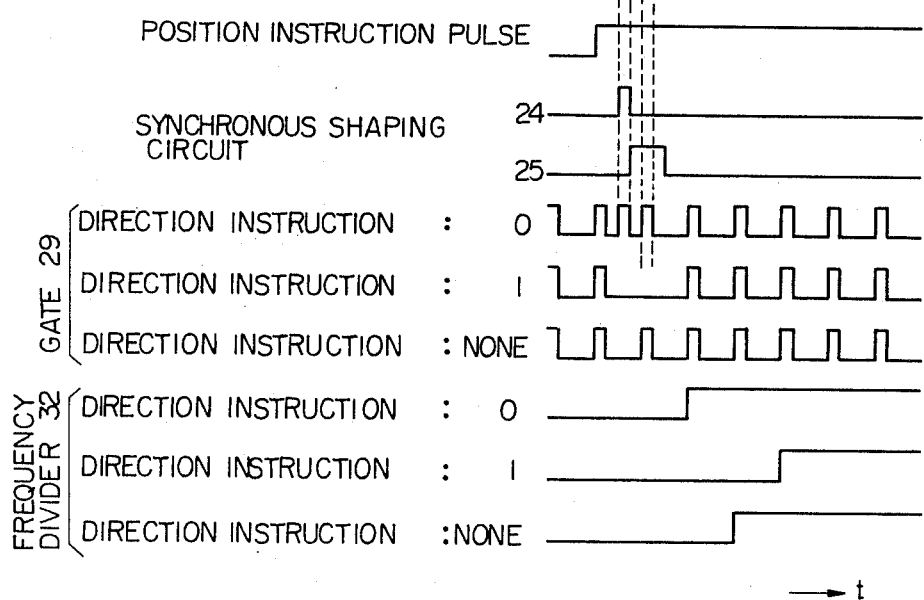
FIG. 7 is a time chart for a description of the operation of the position instruction circuit.

The position instruction circuit 4, as shown in FIG. 5, comprises: synchronous shaping circuits 24 and 25; gates 26, 27, 28 and 29, NOT circuits 30 and 31, a frequency division circuit 32, a reference clock circuit 33, and a two-phase clock circuit 34. Clock signals $\phi_O$, $\phi_A$, $\phi_B$ and $\overline{\phi_B}$ employed in FIG. 5 are as indicated in FIG. 6. An instruction pulse signal applied from outside is shaped by the synchronous shaping circuits 24 and 25 into pulse signals in synchronization with the clock signals $\phi_B$ of $\overline{\phi_B}$. These clock signals are added to the clock signal $\phi_A$ through rotation direction instruction and gate operation, or thin out a part of the clock signal $\phi_A$. If, after this operation, it is converted into a rectangular wave having a suitable frequency by the frequency division circuit 32, then a position instruction signal whose phase is modulated digitally can be obtained. This is the reference signal of the position loop. The above-described operation will become more apparent from a time chart indicated in FIG. 7.

The operation of the entire servo control system will be described. In the case where no position instruction pulse is available, the position instruction signal becomes a square wave having a certain period, and in case of no load the output voltage (speed instruction) of the phase comparison circuit is at 0 V. In addition, if the motor 1 is at rest, the speed feedback signal is also at 0 V. Therefore, the output of the speed amplifier 6 is brought to 0 V, and the armature current of the motor 1 is not allowed to flow. Upon application of load, the rotor position is changed, the phase of the position signal of the resolver 2 lags or leads that of the position instruction signal; that is, a positional deviation occurs. This amount of positional deviation is converted into a DC voltage which is applied to the speed amplifier 6, the output of which is applied to the multipliers 7 and 8 to control the amplitudes of the current instructions. The rotor of the motor is stopped after being displaced through an angle from its state provided under the no load depending on the load torque.

Upon application of the position instruction pulse, the position instruction signal is phase-modulated, and therefore it makes a phase difference with the position feed-back signal from the resolver 2, and the torque occurs through a process similar to that described above, as a result of which the revolution is obtained. Comparison between the phase of the position instruction signal and that of the resolver 2 is carried out as follows:

When the phase shift between them is just 180°, it will be called a phase difference 0. If a flip-flop having a set and reset function is set by the rise of the position instruction signal and reset by the rise of the position feed-back signal of the resolver 2, a square wave of 50% duty is provided as the output of the flip-flop in the case of the phase difference 0. Application of this square wave to a low-pass filter provides a DC voltage at 0 V. When a phase difference occurs, a positive or negative DC voltage can be obtained depending on the direction of the phase shift.

In case of obtaining the current distribution signals with a multi-pole resolver, frequency division is required, and in addition it is required that the frequency division start point can be optionally set. However, this involves a problem that readjustment is required whenever the power switch is turned on. This problem may be solved by a method in which for instance a magnet is provided on the resolver rotor, and the original point pulse is generated by a detecting element such as a Hall element.

Heretofore, a detector utilized for the self-control operation of a synchronous machine is (1) a resolver or a Hall element and (2) a pulse generator or an optical tachometer generator, and it is added with a DC tachometer generator for a speed loop. The pulse generator or the optical tachometer generator in (2) above may be used as the tachometer generator if the f/v conversion is effected; however, it is still disadvantageous in the pulsation of the output during the low speed operation. The resolver or the Hall element can be used as the tachometer generator at all.

In this embodiment, as was described above, the exciting signal and the detection signal of the resolver are suitably combined to be subjected to calculation process, whereby not only the current instruction signal (distribution signal) and the speed feed-back signal but also the position signal are provided and alternate current having a predetermined frequency and a predetermined current value is therefore supplied to the synchronous motor. Accordingly, it is unnecessary to provide an additional detector, and the speed feed-back signal does not suffer from pulsation even during the low speed operation, and furthermore the construction can be markedly simplified.

The first embodiment has been described with reference to the two-phase synchronous motor; however, it is obvious that the technical concept described above can be applied to a three-phase synchronous motor is a 2-phase-to-3-phase converter is additionally provided therefor.

A second embodiment of this invention relates to an improvement of the slip frequency control device of an induction motor.

The vector control system of an induction motor, in which the torque equivalent to that of a shunt DC motor is produced by controlling the instantaneous value of the stator current of the induction motor on the basis of the torque generating principle of a shunt DC motor, is a kind of slip frequency control in which slip correction is carried out so that main magnetic flux is made to be constant in accordance with torque variation.

Figure 10:
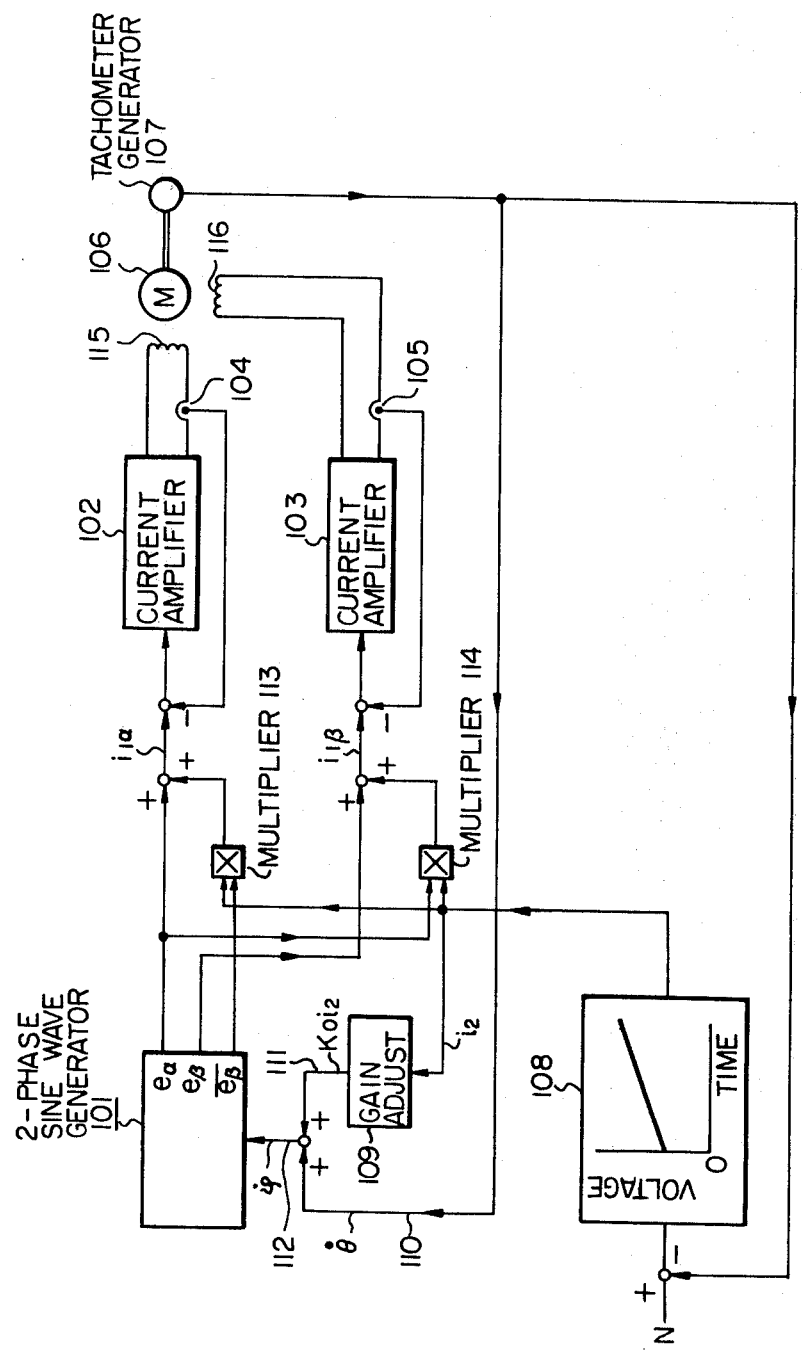
FIGS. 10 and 11 are block diagrams showing a conventional circuit.

FIG. 10 is a block diagram showing a conventional slip frequency control system. The circuit in FIG. 10 comprises a two-phase sine wave generator 101, current amplifiers 102 and 103, current detectors 104 and 105, an induction motor 106, a tachometer generator 107, a speed control amplifier 108, a gain adjusting device, multipliers 113 and 114, and motor stator windings 115 and 116.

The circuit in FIG. 10 is described in detail in the magazine "Yasukawa Denki", Vol. 38 (No. 4 1974), pages 597–599; in the specification of Japanese Patent Application No. 82258/1974 entitled "Control Device of Induction Machine", or in the specification of Japanese Patent Application No. 72637/1974 entitled "Self-control Operation System of Induction Motor by Vector Control". The slip frequency condition for realizing vector control can be expressed by the following Equation (1):

$$\dot{\phi} = \dot{\theta} + K_0 i_2 \tag{1}$$

where $\dot{\phi}$ is the main magnetic flux rotational angular speed (motor primary current angular frequency), $\dot{\theta}$ is the motor rotational angular frequency, and $K_0 = r_2(lm \cdot im)$ in which $r_2$ is the secondary resistance, lm is the exciting inductance per phase, im is the main flux component current, and $i_2$ is the secondary current representative of the torque component.

FIG. 10 shows a $\dot{\phi}$ instruction circuit satisfying Equation (1) which is in the form of an analog circuit. A signal corresponding to the motor rotational angular frequency is provided on a line 110; and a signal corresponding to the slip frequency $K_0 i_2$ is provided on a line 111. These two signals are subjected to addition, as a result of which a signal corresponding to the main magnetic flux rotational angular speed $\dot{\phi}$ is provided on a line 112.

With sine wave signal $e_\alpha$, $e_\beta$ and $\overline{e_\beta}$ (which is a signal obtained by inverting the signal $e_\beta$) generated by the two-phase sine wave generator 101, the secondary current signal $i_2$ and the multipliers 113 and 114, two-phase stator currents $i_{1\alpha}$ and $i_{1\beta}$ are formed.

Figure 11:
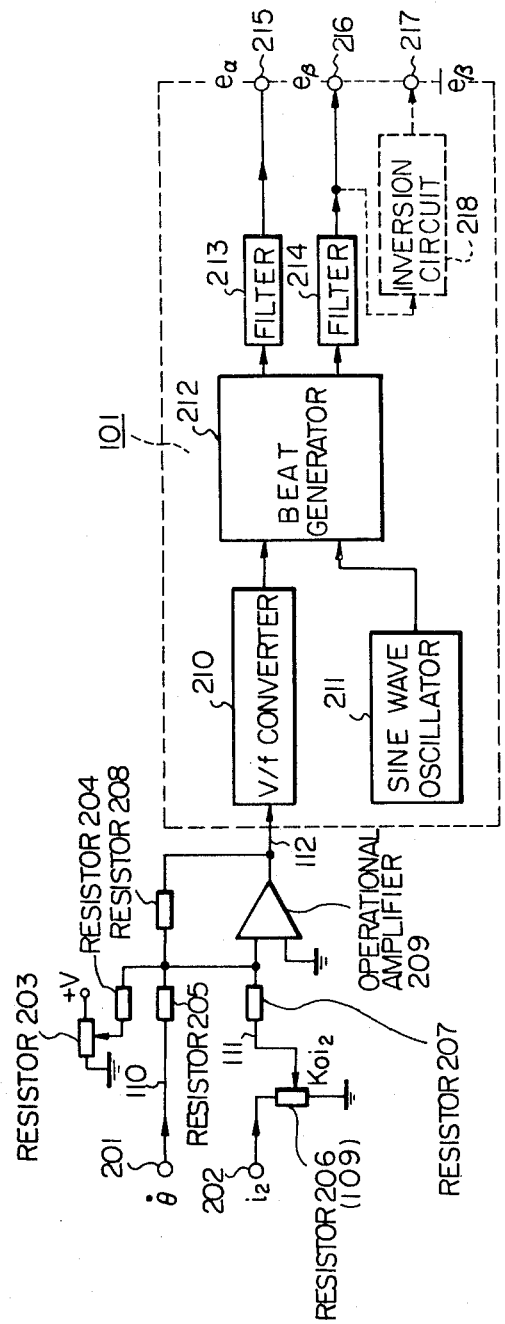

FIG. 11 shows a circuit adapted to provide the signals $e_\alpha$, $e_\beta$ and $\overline{e_\beta}$ indicated in FIG. 10.

Signals corresponding to the motor rotational angular frequency $\dot{\theta}$ and the secondary current component $i_2$ are applied to terminals 201 and 202, respectively. The circuit in FIG. 11 further comprises: resistors 203 through 208, an operational amplifier 209, a voltage-to-frequency converter 210; a reference sine wave oscillator 211, a two-phase beat generator; low-pass filters 213 and 214, and an inversion circuit 218. The value of the resistor 203 is so adjusted that when the inputs to the terminals 201 and 202 are at 0 V, the output frequency of the voltage-to-frequency converter is equal to the frequency of the reference since wave generator 211. The resistor 206 (or a gain adjusting device 109) is to set the constant $K_0$. The output of the operational amplifier 209 corresponds to $(\dot{\theta} + K i_2)$, that is, it corresponds to $\dot{\phi}$.

If a frequency corresponding to $\dot{\phi}$ is allowed to beat against the reference sine wave and the resultant signals are allowed to pass through the low pass filters 213 and 214, then the sine wave signals $e_\alpha$, $e_\beta$ and $\overline{e_\beta}$ are provided on terminals 215, 216 and 217, respectively.

This analog system is disadvantageous in that the oscillation frequency of the reference sine wave generator 211 is varied because of temperature drift, and it is difficult to control the temperature drift of the output of the operational amplifier 209 and the values of the resistors 203 and 206.

In view of the foregoing, this embodiment is intended to form a circuit in a digital mode, which corresponds to the circuit shown in FIG. 11, by utilizing a resolver signal.

Figure 12:
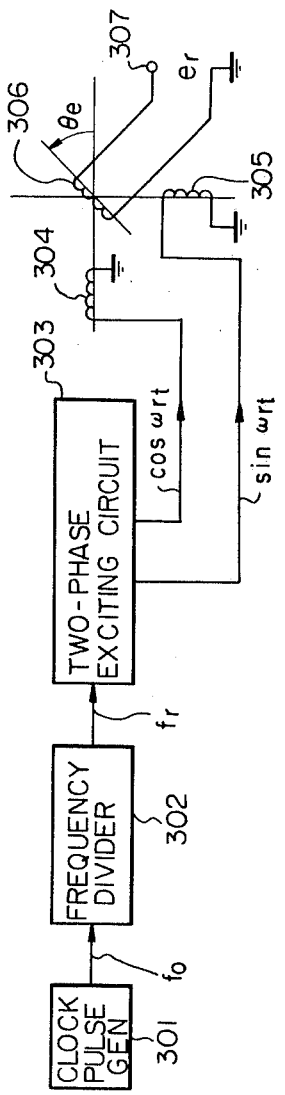
FIG. 12 is a block diagram showing a resolver exciting circuit on which a second embodiment of the invention has been developed.

FIG. 12 shows an exciting circuit for resolver exciting windings, which is a theoretical circuit of this embodiment.

The exciting circuit, as shown in FIG. 12, comprises: a reference clock pulse generator 301, a frequency division circuit 302; a two-phase exciting circuit 303; resolver exciting windings 304 and 305; and a detecting winding 306. If it is assumed that the output frequency of the frequency division circuit 302 is $f_r$, and $\omega_r = 2\pi f_r$, then signals cos $\omega_r t$ and sin $\omega_r t$ are provided to the resolver windings 304 and 305. A value $\theta_e$ indicated in FIG. 12 is intended to designate of the resolver's rotor rotational electrical angle which is a function of the rotational speed N of the rotor. An output voltage provided at the terminal 307 can be expressed by the following Equation (2):

$$e_r = E_r \sin(\omega_r t + \theta_e) \tag{2}$$

Figure 13:
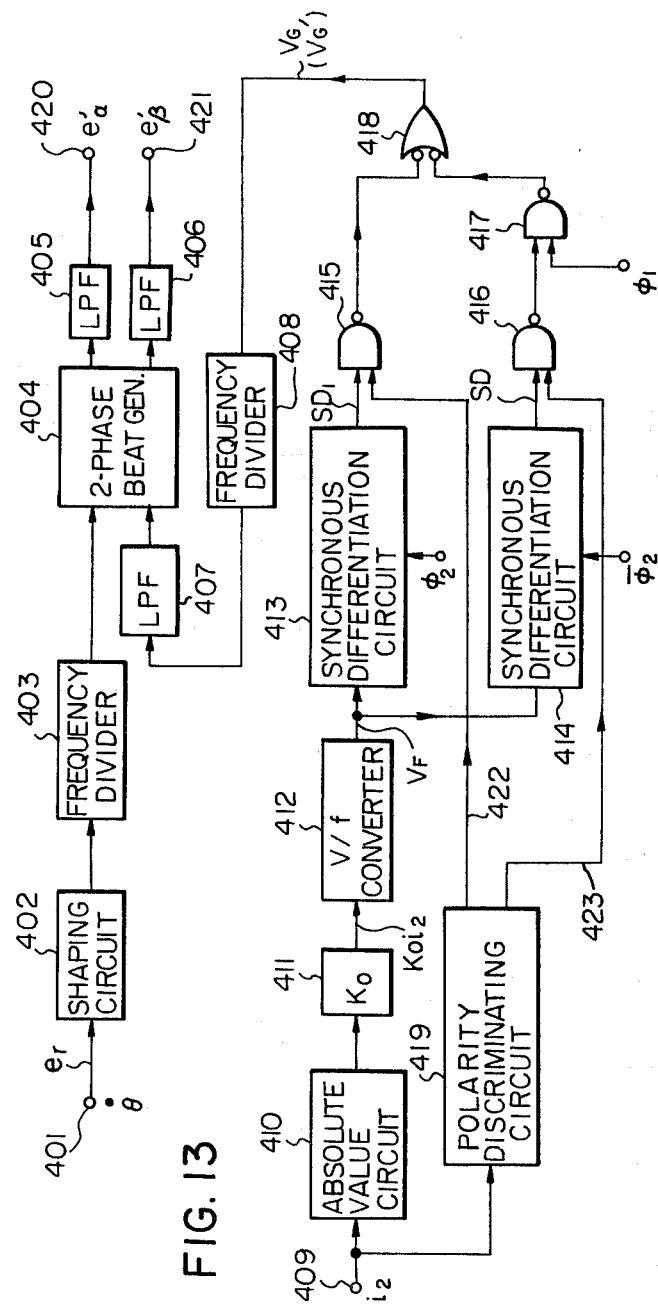
FIG. 13 is also a block diagram showing the second embodiment of the invention.

FIG. 13 is a block diagram showing a circuit according to this embodiment.

A signal from the resolver (307) in FIG. 12 is applied to a terminal 401. In FIG. 13, reference numeral 402 designates a waveform shaping circuit; reference numerals 403 and 408, frequency division circuit; reference numeral 404, a two-phase beat generator; and reference numerals 405, 406 and 407, low-pass filters.

The torque instruction signal $i_2$ is applied to a terminal 409. This signal may be a constant voltage instruction or the output of the speed control amplifier 108 in FIG. 10.

In FIG. 13, reference numeral 410 designates an absolute value circuit; reference numeral 411, a $K_0$ setting device; reference numeral 412, a voltage-to-frequency converter; reference numerals 413 and 414, synchronous differentiation circuits; reference numerals 415 through 418, NAND circuits; and reference numeral 419, a polarity discriminating circuit. Sine wave signals $e'_\alpha$ and $e'_\beta$ which are 90° out of phase with each other is delivered out through terminals 420 and 421, respectively. These signals are in correspondence to the signals $e_\alpha$ and $e_\beta$ in FIG. 10.

Figure 13A:
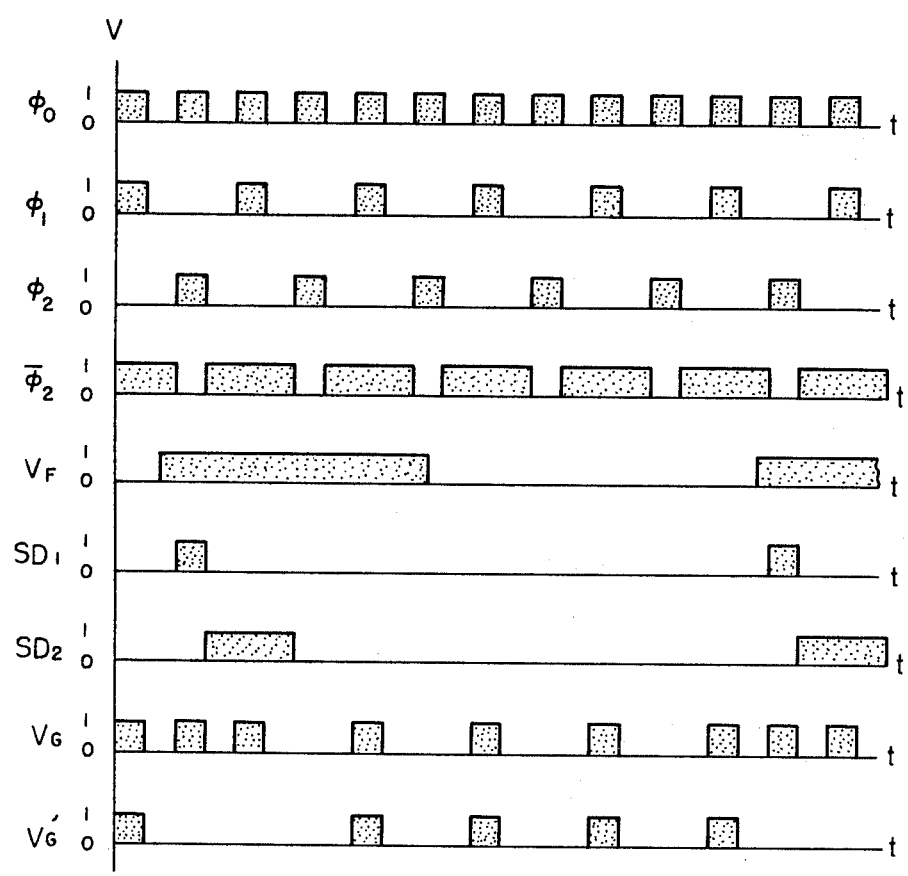
FIG. 13a is a time chart indicating the signals in various circuits in FIG. 13.

FIG. 13a is a time chart showing the signals of various circuits in FIG. 13 with respect to this embodiment.

A signal $\phi_0$ is a clock pulse outputted by the clock pulse generator 301 in FIG. 12. Each of signals $\phi_1$ and $\phi_2$ is a pulse signal obtained by subjecting the clock pulse $\phi_1$ to $\frac{1}{2}$ frequency division. A signal $\overline{\phi_2}$ is a pulse obtained as a result of the NOT logic operation of the pulse $\phi_2$. In the time chart in FIG. 13a, "V" on the vertical axis indicates voltage, "t" on the horizontal axis indicates time, and "0" and "1" are logical levels.

After being shaped by the waveform shaping circuit 402, a signal from the resolver is subjected to frequency division in a frequency division ratio $n_r$ by the frequency division circuit 403 so that $1/n_r$ of the electrical angle $\theta_e$ of Equation (2) is equal to the motor rotational frequency, that is, it is frequency-divided so that $\omega_r = 2\pi f_r$ is divided by $n_r$.

On the other hand, the torque instruction signal $i_2$ applied to the terminal 409 has a positive (or negative) voltage polarity while the motor's rotation direction is changed from the clockwise direction to the counterclockwise direction as in the driving period, and has a negative (or positive) voltage polarity while the motor's rotation direction is changed from the counterclockwise direction to the clockwise direction as in the braking period. When the revolution speed is constant, the value is maintained at a constant value corresponding to load. The absolute value of the torque instruction signal $i_2$ is obtained by the absolute value circuit 410, and the torque instruction signal $i_2$ is multiplied by the constant $K_0$ in the $K_0$ setting device 411, thereby to provide a torque instruction signal $K_0 i_2$. This signal $K_0 i_2$ is converted into a pulse $V_F$ having a frequency $f_s$ by the voltage-to-frequency converter 412. The pulse $V_F$ is applied to the synchronous differentiation circuits 413 and 414, where it is converted in to pulses $SD_1$ and $SD_2$ which are in synchronization with the pulses $\phi_2$ and $\overline{\phi_2}$ and have the same period as the pulse $V_F$.

In the polarity discriminating circuit 419, when the line 422 has the logical level "1", the line 423 has the logical level "0" depending on the polarity of the torque instruction signal $i_2$, for instance, in the driving period, and the pulse $SD_1$ is added to the pulse $\phi_1$ whereby a pulse $V_G$ is outputted by the NAND circuit 418. During the braking operation, the line 422 has the logical level "0", while the line 423 has the logical level "1", and therefore a part of the pulse $\phi_1$ is eliminated by the pulse $SD_2$, as a result of which a pulse $V_G'$ is outputted by the NAND circuit 418.

If the frequency of the pulse $\phi_1$ is represented by $f_1$, then an output signal $e_1$ phase-modulated with a pulse having a slip frequency component $K_0 i_2$ can be expressed by the following Equation (3):

$$e_1 = E_1 \sin(\omega_1 t + \theta_S) \quad (3)$$

where $\omega_1 = 2\pi f_1$, and $\theta_S$ is the phase shift angle caused by a pulse having a slip frequency component $K i_2$ and is the function of the torque instruction $i_2$.

The frequency $f_1$ in Equation (3) is subjected to frequency division in the frequency ratio $n_1$ satisfying the following Equation (4) by the frequency division circuit 408:

$$\omega_r/n_r = \omega_1/n_1 = \omega \quad (4)$$

In this case, the phase shift angle $\theta_S$ is $\theta_S/n_1$. The signal from the frequency division circuit 408 is applied to the low-pass filter 407, where it becomes a sine wave $e_1'$ as expressed by Equation (5):

$$e_1' = E_1 \sin(\omega t + \theta_S/n_1) \quad (5)$$

The pulse passing through the frequency division circuit 408 is applied to a two-phase sine wave signal conversion circuit (not shown) in the two-phase beat generator 404, where it is converted into a sine wave $e_r'$ as expressed by Equation (6):

$$e_r' = E_r \sin(\omega t + \theta_e/n_r) \quad (6)$$

The signals $e_1'$ and $e_r'$ expressed by Equations (5) and (6) are multiplied by each other by a multiplier (not shown) in the two-phase beat generator 404, and the resultant signal is applied to the low-pass filter 405, as a result of which a sine wave signal as expressed by Equation (7) is provided at the terminal 420.

$$e_\alpha' = \frac{E_1 E_r}{2} \cos(\theta_e/n_r - \theta_S/n_1) \quad (7)$$

In this case, a sine wave signal as expressed by the following Equation (8) is provided at the terminal 421 with the aid of the low-pass filter 406:

$$e_\beta' = \frac{E_1 E_r}{2} \sin(\theta_e/n_r - \theta_S/n_1) \quad (8)$$

The two-phase stator current components ($i_{1\alpha}$ and $i_{1\beta}$ in FIG. 1) are instructed by using the sine wave signals expressed by Equations (7) and (8).

The embodiment has been described with reference to the case of two-phase operation; however, it is obvious that the technical concept of the invention can be applied to a three-phase operation, if a two-phase-to-three-phase converter is employed.

The embodiment will be described by showing concrete numerical data. If the clock frequency $f_0 = 200$ KHz, the resolver's exciting frequency $f_r = 125$ KHz ($f_r = 1/16 \cdot f_0$), the number of poles of the resolver $P_r = 100$, and the number of poles of the motor to be controlled $P_m = 4$, the output signal frequency of the resolver can be expressed by the following Equation (9):

$$f_r + \frac{NP_r}{120} = 125 \text{ KHz} + 1.5 \text{ KHz} \quad (9)$$

where N is the revolution per minute of the motor 106. When N = 1800 rpm, the motor's rotational frequency is 60 Hz. In order to make 1.5 KHz equal to the motor's rotational frequency 60 Hz, 1/25 frequency division is required. This means $n_r = 25$ in Equation (4). In this case, the resolver exciting frequency will become 500 Hz. That is, if $\omega = 2\pi f$ in Equation (4), then f = 500 Hz is obtained.

On the other hand, since the fundamental frequency $f_1$ for slip frequency calculation is obtained by subjecting the reference clock frequency $f_0$ to $\frac{1}{2}$ frequency division, the output frequency of the NAND circuit 418 can be expressed by the following Equation (10):

$$f_1 = f_S = 100 \text{ KHz} = f_S \quad (10)$$

In this connection, as $F_S$ gives a slip frequency component, 1/200 frequency division is needed to change $f_1$ to 500 Hz through frequency division. In this case, $f = 1/200 \cdot f_1$. That is, $n_1 = 200$ is required in Equation (4). If it is assumed that the motor's most suitable slip frequency at the time of generating the rated torque is 1 Hz, then the torque instruction $K_0 i_2$ can be so adjusted that $f_S/200 = 1$ Hz, or $f_S = 200$ Hz, is instructed by the voltage-to-frequency converter 412.

As is clear from the above description, according to this embodiment, the slip frequency component $K_0 i_2$ and the motor rotational angular frequency $\theta$ are calculated in a digital mode by suitably utilizing the resolver, and therefore the vector control of the induction motor can be effected with high accuracy even in the low speed range.

A third embodiment of this invention is intended to obtain a rotation speed signal from the detecting signal of the resolver.

Heretofore, in a digital position servo utilized for numerical control or the like, either a position detection (digital system) with a photoelectrical tachometer generator and a revolution speed detection with a DC tachometer generator or a revolution speed detection with a DC tachometer generator and a position detection (analog system) with a resolver or an electromagnetic induction type position detector (the trade mark being "Inductosyn") are utilized.

As a result of the development of transistor servo control, dynamic control can be applied to an induction machine and a synchronous machine. For a DC servomotor, a DC tachometer generator may be effectively employed. However, in the case of an AC servo-motor, the detector side also should be of the brushless type; otherwise the brushless effect cannot be sufficiently obtained. If a rotational position detector and a speed detector are separately provided, in practice the cost of them including their installation of the motor is much higher than that of the motor body.

This embodiment of this invention is to solve the above-described problem. This embodiment will be described with reference to FIG. 14.

Figure 14:
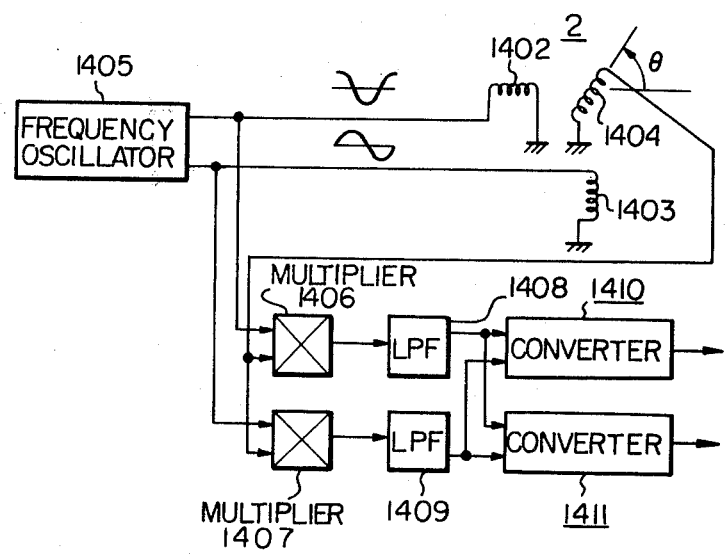
FIG. 14 is a connection diagram illustrating a third embodiment of the invention.

In FIG. 14, reference numeral 2 designates a resolver comprising two-phase exciting windings 1402 and 1403, and a detecting winding 1404 which will provide an output corresponding to a rotor's rotational angle, and reference numeral 1405 designates a fixed frequency oscillator adapted to produce two-phase sine wave ($E_1 \cos \omega_1 t$ and $E_1 \sin \omega_1 t$) having constant frequencies which excite the exciting windings 1402 and 1403 of the resolver 2. In FIG. 14, reference numerals 1406 and 1407 designate multipliers in which the output of the detecting winding is multiplied by the two-phase sine wave outputs of the fixed frequency oscillator 1405, respectively. The following voltage is induced in the detecting winding 1404 according to the rotation angle $\theta$ of the rotor.

$$E_\theta \cos(\omega_1 t - \theta)$$

Accordingly, the outputs of the multipliers 1406 and 1407 can be expressed by the following Equation (11) and (12):

$$E_1 \cos\omega_1 t \times E_\theta \cos(\omega_1 t - \theta) = \frac{E_1 E_\theta}{2} [\cos\theta + \cos(2\omega_1 t - \theta)] \quad (11)$$

$$E_1 \sin\omega_1 t \times E_\theta \cos(\omega_1 t - \theta) = \frac{E_1 E_\theta}{2} [\sin\theta + \sin(2\omega_1 t - \theta)] \quad (12)$$

These voltage in Equations (11) and (12) can be expressed as follows (13) and (14), respectively, if harmonic waves are removed therefrom.

$$E \cos \theta \quad (13)$$

$$E \sin \theta \quad (14)$$

where $$E = \frac{E_1 E_2}{2} \quad (15)$$

Thus, two-phase signals corresponding to the rotation angle $\theta$ can be obtained.

Figure 15:
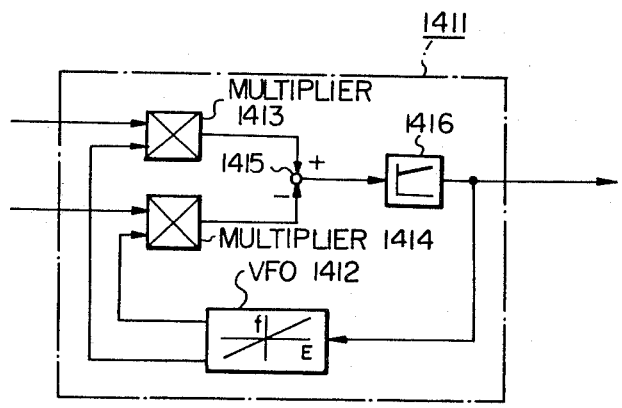
FIG. 15 is a connection diagram showing a conversion circuit in FIG. 14.

In FIG. 14, reference numerals 1408 and 1409 designate low-pass filters, reference numeral 1410 designates a circuit for converting the two-phase signals into rotational position signals, the circuit 1410 being employed in a conventional position servo control also (therefore, the detailed description thereof being omitted), and reference numeral 1411 designates a circuit for converting the two-phase signals into rotation speed signals. The circuit 1411, as shown in FIG. 15, comprises a variable frequency oscillator 1412 adapted to output two-phase sine waves, two multipliers 1413 and 1414, a comparator 1415, and a proportional integration amplifier 1416.

The two-phase signal ($E \cos \theta$ and $E \sin \theta$) and the two-phase sine waves ($E_2 \sin \omega_2 t$ and $E_2 \cos \omega_2 t$) of the variable frequency oscillator 1412 are subjected to multiplication in the multipliers 1413 and 1414, respectively, and the resultant data are subjected to subtraction in the comparator 1415.

That is $$E \cos \theta \times E_2 \sin \omega_2 t - E \sin \theta \times E_2 \cos \omega_2 t = \quad (16)$$
$$E E_2 \sin (\omega_2 t - \theta)$$

If the rotation angle of the motor is expressed by $\theta = \omega_m t - \theta_m$ ($\omega_m$ is the rotation speed), then $$\sin (\omega_2 t - \theta) = \sin [(\omega_2 - \omega_m)t + \theta_m] \quad (17)$$

If $\omega_2 = \omega_m$, then the output will become a constant DC value $\sin \theta_m$. In contrast, if automatic control is effected in such a manner that the signal described above is fed back to the input of the variable frequency oscillator 1412 through the proportional integration amplifier 1416 so that the above-described value has a constant value (or 0), then the input of the variable frequency oscillator 1412 is proportional to $\omega_m$ (rotation speed), and a rotation speed signal can be obtained.

As is apparent from the above description, in this embodiment, the rotation speed signal also can be obtained by utilizing a part of the resolver's position control circuit. Since it is of the analog type, it does not suffer from speed ripples in low speed operation which may be caused in the case where a pulse generator is utilized.

Figure 16:
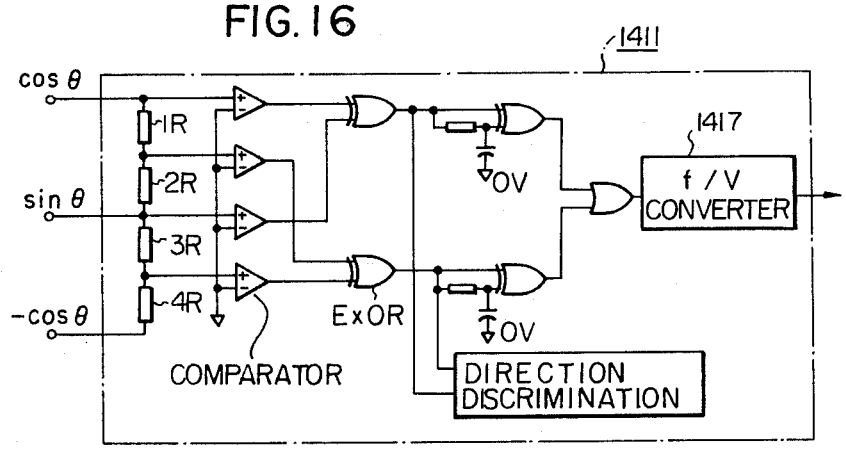
FIG. 16 is a connection diagram showing a modification of the conversion circuit.
Figure 17:
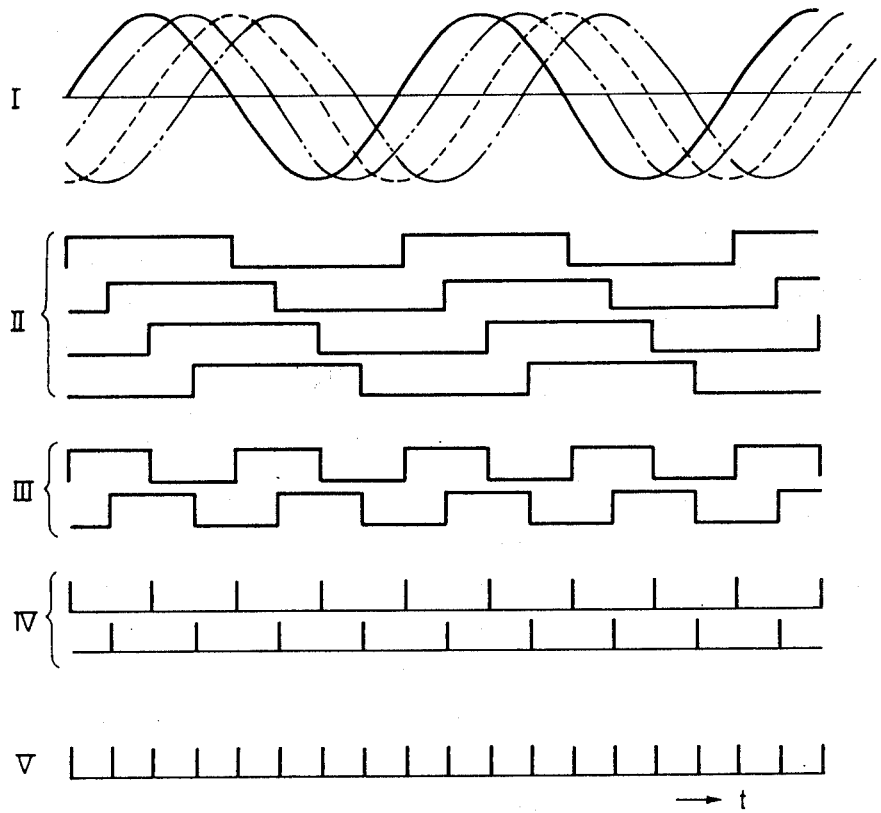
FIG. 17 is a waveform diagram indicating various waveforms employed in the circuit shown in FIG. 16.

The circuit 1411 for converting the two-phase signals into the rotation speed signals may be constructed in an analog mode. More specifically, as shown in FIG. 16, the two-phase signals (cos $\theta$ and sin $\theta$) are subjected to voltage division by means of resistors 1R, 2R, 3R and 4R all of which are equal in resistance, so that signals cos $\theta$, cos ($\theta - 45°$) and cos ($\theta - 90°$) or sin $\theta$, and cos ($\theta - 135°$) are formed. These signals are compared with a potential "0" in comparators to form square waves (the part II in FIG. 17). These square waves are subjected to logical operation in EXCLUSIVE OR circuits separately according to the groups, as a result of which two-phase square waves each having a frequency twice the fundamental frequency are obtained (the part III of FIG. 17). If the leading and trailing edges of these square waves are processed as pulses (the part IV of FIG. 17) and are subjected to addition, then a pulse train the frequency of which is eight times the fundamental frequency can be obtained (the part V of FIG. 17). This pulse train is applied to a frequency-to-voltage converter 1417 to obtain an analog rotation speed signal. The rotation direction is determined by phase comparison effected with respect to the leading and trailing edges of the two-phase square waves.

Described above is the case of two-phase square waves. The device can be manufactured in the form of an integrated circuit as is clear from the above-described diagrams. Therefore, the number of phases may be increased to about ten times. Thus, the device can be made to be compact in construction and high in reliability.

The arrangement of the invention is as described above. Not only the rotation position signal but also the rotation speed signal can be obtained from the detecting signal of one resolver. Since the resolver may be of the brushless type, if it is combined with an AC servomotor, the brushless effect is obtained throughout the device. Thus, the construction of the device can be considerably simplified.

A fourth embodiment of the invention relates to a control system in which the servo-control of an induction motor is effected in a digital mode.

A device has been proposed in the art in which a stator exciting component (reactive component) and a torque current component (active component) are obtained from load, and these components are combined so that a stator current is supplied as phase current instruction, whereby the servo-control of the induction motor can be effected similarly as in the case of a DC shunt motor.

In this embodiment, the various processes described above are carried out in a digital mode, and yet higher servo-controllability is provided. This embodiment will be described with reference to FIG. 18.

Figure 18:
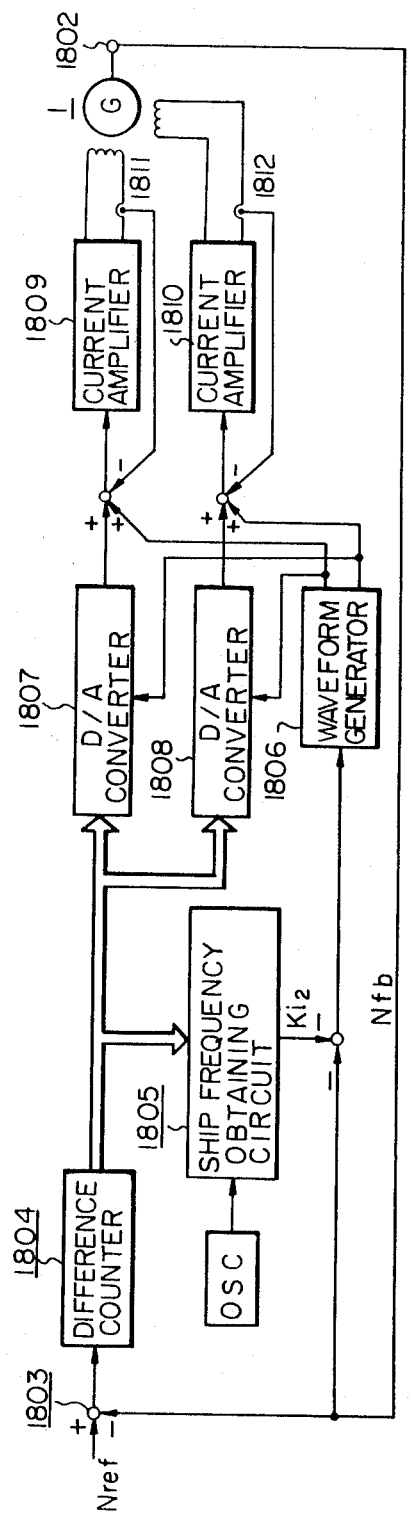
FIG. 18 is a block diagram illustrating a fourth embodiment of the invention.

Referring to FIG. 18, reference numeral 1 designates a two-phase induction motor; 1802, a pulse generator coupled to the induction motor 1; 1803, a comparator in which a feed-back pulse Nfb generated by the pulse generator 1802 in accordance with the actual speed of the motor 1 is compared with a speed instruction pulse Nref, and the resultant difference is applied to a different counter 1804; 1805, a circuit for obtaining a slip frequency, the circuit 1805 calculating the optimum slip frequency according to the contents of the difference counter 1804 at all times; 1806, a waveform generator for generating two-phase sine waves having a most suitable driving frequency by utilizing the pulse Nfb outputted by the pulse generator 1802 and the slip frequency, the two sine waves being 90° out of phase with each other; and 1807 and 1808, D/A converters, in which the sine wave signals generated by the waveform generator 1806 and the contents of the difference counter 1804 are subjected to multiplication thereby to form a torque current component (active component) signal of each pulse winding in the motor 1. The two sine waves generated by the waveform generator 1806 are, as they are, in correspondence to the stator exciting current component (reactive component) of each phase winding. Therefore, if these sine waves are combined with the output signals of the D/A converters 1807 and 1808, respectively, signals corresponding to each phase winding current can be obtained.

In FIG. 18, reference numerals 1809 and 1810 designate current amplifiers having predetermined amplification factors according to the capacity of the motor 1, and reference numerals 1811 and 1812 designates current transformers (CT) for current minor loop.

Since the embodiment is constructed as described above, all of the signal processes are carried out in a digital mode, and acceleration, steady operation, deceleration of the motor 1 are precisely carried out with the optimum slip at all times.

Figure 19B:
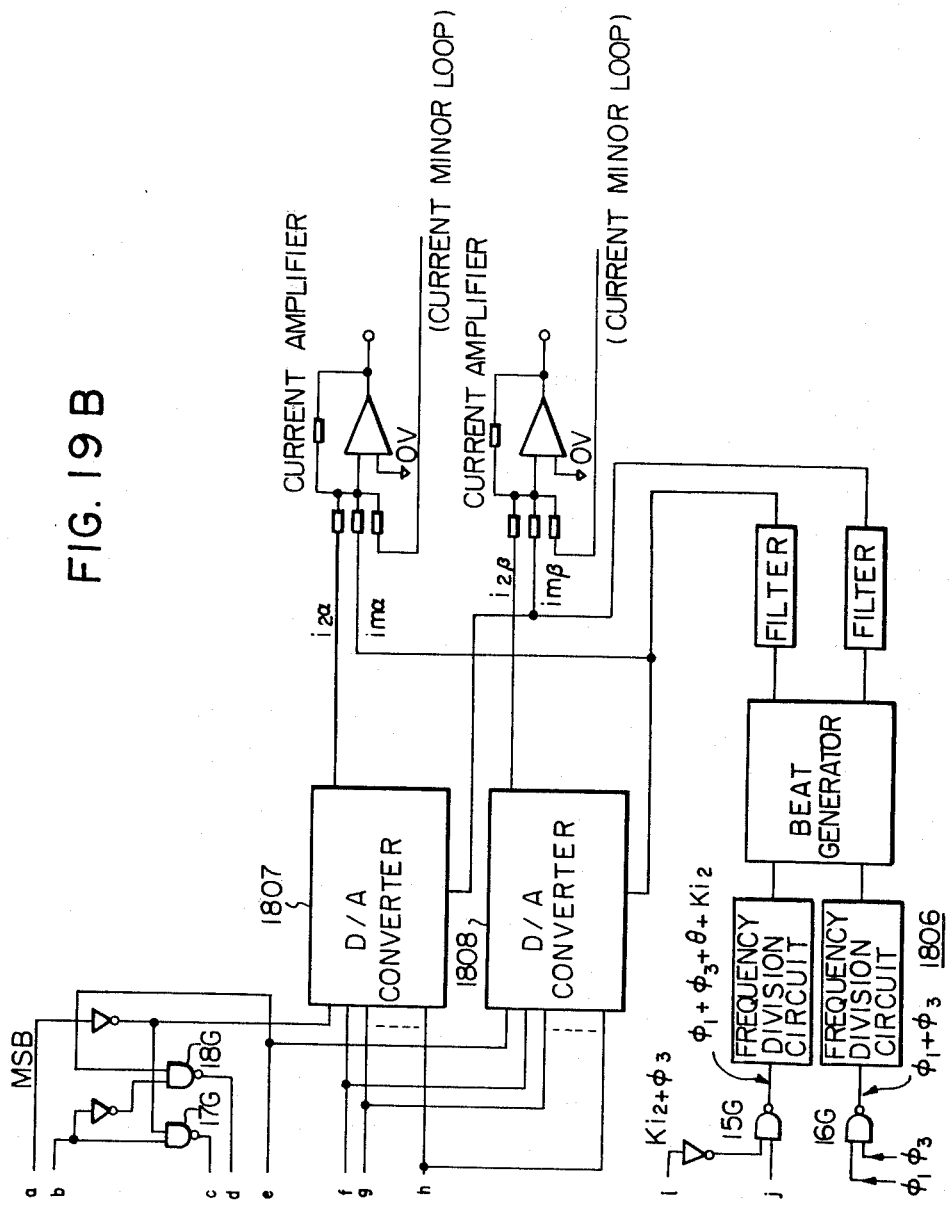

The circuit in FIG. 18 is illustrated in more detail in FIGS. 19A and 19B.

The feed-back pulse Nfb of the pulse generator 1802 consists of two-phase signals, or A phase and B phase signals, which are 90° out of phase with each other as indicated in FIG. 20. It can be determined from the phase relation between these signals whether the rotation direction of the motor 1 is a clockwise direction (CW) or a counter clockwise direction (CCW). FIG. 21 indicates various clock pulses employed in the circuit in FIG. 19, showing the phase relationships among clock pulses $\phi_1$, $\phi_2$, $\phi_3$ and $\phi_4$ each of which occurs every fourth reference clock pulse $\phi_0$, and clock pulses $\phi_{10}$ and $\phi_{30}$ having a repetition frequency which is ¼ of that of the reference clock pulse $\phi_0$.

The feed-back pulse Nfb passes through a gate 1G or 2G which is opened or closed by the output of a rotation direction discriminating circuit 1813, and it is compared with the speed instruction pulse Nref which passes through a gate 3G or 4G by means of a gate 5G or 6G in the comparison circuit 1803. The gate 3G or 4G is opened or closed by a direction instruction DA. The resultant difference is applied to either the down input 1841 of the difference counter 1804 or the up input 1842. The circuit 1805 for obtaining the slip frequency is provided with an oscillator OSC, and a multiplier M operating to subject the oscillation frequency of the oscillator OSC to frequency division. The absolute value of the amount of difference counted by the difference counter and its polarity are inputted to the multiplier M. The D/A converters 1807 and 1808 are each made up of an addition circuit employing an operational amplifier. In the D/A converters, an analog switch is turned on or off in accordance with the high (H) or low (L) level of each bit of the output of the difference counter 1804, so that the reference voltage is inputted thereto. If this reference voltage is replaced by an input to be multiplied, then multiplication of digital data and analog data can be readily achieved.

If the addition input resistances of the operational amplifiers are weighted in accordance with the output bits of the difference counter 1804, then an output proportional to the amount of difference can be obtained. The polarity (positive or negative) of the difference can be discriminated by switching the inverted input and the non-inverted input of the input to be multiplied.

For the waveform generator 1806 for generating the two-phase sine waves, a variety of constructions can be considered. However, in this embodiment, positive and negative frequencies with respect to the reference frequency are obtained in accordance with the revolution speed and rotation direction of the motor, to provide the beat frequencies thereof, thereby to provide the two-phase sine waves.

Consider the case where the direction instruction DA is at the low level (hereinafter referred to merely as "L" when applicable).

The instruction pulse Nref is applied through the gate 4G to the up input 1842 of the difference counter 1804. The n-th (MSB) bit of the difference counter 1804 is a code bit, and it is at the low level when the number of input pulses to the up input 1842 is more than the number of input pulse to the down input 1843. In this case, the gate 11G is opened, a pulse synchronous with the clock pulse $\phi_4$ together with clock pulses $\phi_3$ and $\phi_1$ is applied to the gate 15G in accordance with the output of the multiplier M. In this case, the beat frequencies are provided by $(\phi_1 - \phi_3)$ and $(\phi_1 + \phi_3 +$ a part of $\phi_4)$. The term "a part of $\phi_4$" is intended to mean pulses which are different from continuously applied pulses such as those $\phi_1$ and $\phi_3$; that is, it is intended to mean that pulses in synchronization with the pulse signal $\phi_4$ are intermittently applied according to the multiplier M, which corresponds to the slip frequency $K_{i2}$ of the motor. In this case, the torque current instruction (the output of the D/A converters 1807 and 1808) generates the torque causing the motor to rotate counterclockwise, as a result of which the motor starts its revolution. At the same time, the gate 1G is opened by the output of the rotation direction discriminating circuit 1813, and the pulses are inputted to the down input 1841 of the difference counter, as a result of which the amount of difference is decreased. The feed-back pulse Nfb of the pulse generator 1802 is applied through the gate 10G to the gate 15G. Therefore, the frequency of the waveform generator 1806 is further increased, and the revolution speed of the motor is also increased.

In the case of only one rotation direction, the output of the pulse generator 1802 may be of the single phase, and provision of the direction discrimination circuit is not required.

Consider the case where the direction instruction is at "H". In this case, the instruction pulse Nref is applied through the gate 3G to the down input 1841 of the difference counter 1804. The code bit is raised to "H". The output of the counter 1804 is applied to the EXCLUSIVE OR circuit, where the complement (absolute value) thereof is obtained and it is applied to the multiplier M and the D/A converters 1807 and 1808. Since the code bit is at "H", the gate 12G is opened, and therefore the output of the multiplier M in synchronization with the clock pulse $\phi_{30}$ is applied to the gate 13G. This signal is a pulse signal at "L" level which overlaps the "H" level of the clock pulse $\phi_3$, and which eliminates a part of the clock pulse $\phi_3$. Accordingly, ($\phi_1 + \phi_3$— *the number of pulses corresponding to the output of the multiplier*) is applied to the gate 15G, and the frequency of the waveform generator 1806 becomes negative with respect to the reference frequency ($\phi_1 + \phi_3$). This means that the motor's rotation direction is changed from CCW to CW. The torque current instruction (the output of the D/A converter) generates the torque which will cause the motor to rotate clockwise (CW).

As soon as the motor starts its clockwise rotation, the gate 2G is opened by the output of the rotation direction discriminating circuit 1813, and the feedback pulse Nfb from the pulse generator 1802 is applied to the gate 9G through a synchronous differentiation circuit 1814 to which the clock pulse $\phi_{10}$ is applied.

This pulse is a signal at "L" level which overlaps the "H" level of the clock pulse $\phi_1$, and eliminates a part of the clock pulse $\phi_1$. Therefore, the frequency of the waveform generator 1806 is further increased, and the revolution speed of the motor is also increased. At the same time, the pulse from the gate 2G is applied to the up input of the difference counter 1804, and therefore the amount of difference is decreased. The outputs of the D/A converters 1807 and 1808 are proportional to the amount of difference in the difference counter 1804. Accordingly, as the amount of difference decreases, the torque is decreased, and when it becomes in balance with the load torque, the amount of difference in the difference counter 1804 becomes constant.

The gates 7G and 8G are to prevent saturation of the difference counter 1804. For instance, in the case where a large number of up-count inputs are provided, when the amount of difference reaches the (n-1)th bit, the input of the gate 8G is changed to "L" level to close it, thereby to prevent the application of the up-count input to decrease the capacity (the number of bits) of the difference counter 1804.

In the above-described embodiment, the beat oscillator is used as the waveform generator; however, if information on the two-phase sine waves is stored in a read only memory (ROM), and the information is read out with the aid of a pulse input, then it can be used as the exciting current instruction.

The same thing may be achieved with a shift register.

Furthermore, if the multiplier M is eliminated and a pulse signal having a predetermined frequency is added to or subtracted from the oscillation frequency of the oscillator OSC, then a constant slip frequency control type inverter can be formed.

As is apparent from the above description, all of the signal processes are effected in a digital mode in this embodiment, and therefore the carrier frequency of the two-phase oscillator can be increased and stabilized. Accordingly, it is possible to form a drive system high in accuracy and response, and it is also possible to combine it with a computer. Thus, the construction of the system can be simplified. Furthermore, the drive system according to this embodiment can be applied to a large capacity motor.

For convenience in description, the embodiment has been described with reference to the case where the two-phase induction motor is driven; however, it is obvious that the technical concept of the invention can be applied to a three-phase induction motor by using a known 2-phase-to-3-phase converter.

A fifth embodiment of this invention relates to a control device of an induction motor which is driven by square wave current in 120° electricity application.

A device in which, when an induction motor is driven through a thyristor, the frequency control of the motor primary current is effected with a square wave signal of 120° electricity application, is well known in the art. Its circuit is, for instance, as indicated in FIG. 4 on page 169 of the magazine "Yasukawa Denki" Vol. 36, No. 138 (1972, No. 2). However, in this circuit, the square wave signal of 120° electricity application merely varies the frequency, and no consideration is paid to its phase control.

Accordingly, the conventional device is inadvantageous in that it cannot respond to variations in phase of the motor primary current when the load is abruptly changed; that is, it is difficult for the device to obtain high speed response characteristic equivalent to that of a DC machine.

The fifth embodiment will be described with reference to FIG. 22 which is a block diagram showing a circuit according to the embodiment.

The circuit comprises: an AC electric source 2100; a current transformer 2101; a thyristor 2102 for converting AC to DC; a DC reactor 2103; thyristors 2041 through 2046 for inverters; a commutation capacitor 2105; a series diode 2106; an induction motor 2107; a motor rotation speed detecting device 2108; a current detecting circuit 2109; a current amplifier 2110; a phase shifter 2111; a synchronous signal input terminal 2112 to a three-phase electric source; a function generator 2113; a two-phase sine wave generator 2114; a frequency-to-voltage converter 2115; a speed amplifier 2116; a vector calculating circuit 2117; a 2-phase-to-3-phase converter 2118; a waveform shaping circuit 2119; a logical circuit 2120; and a gate circuit 2121.

Figure 22:
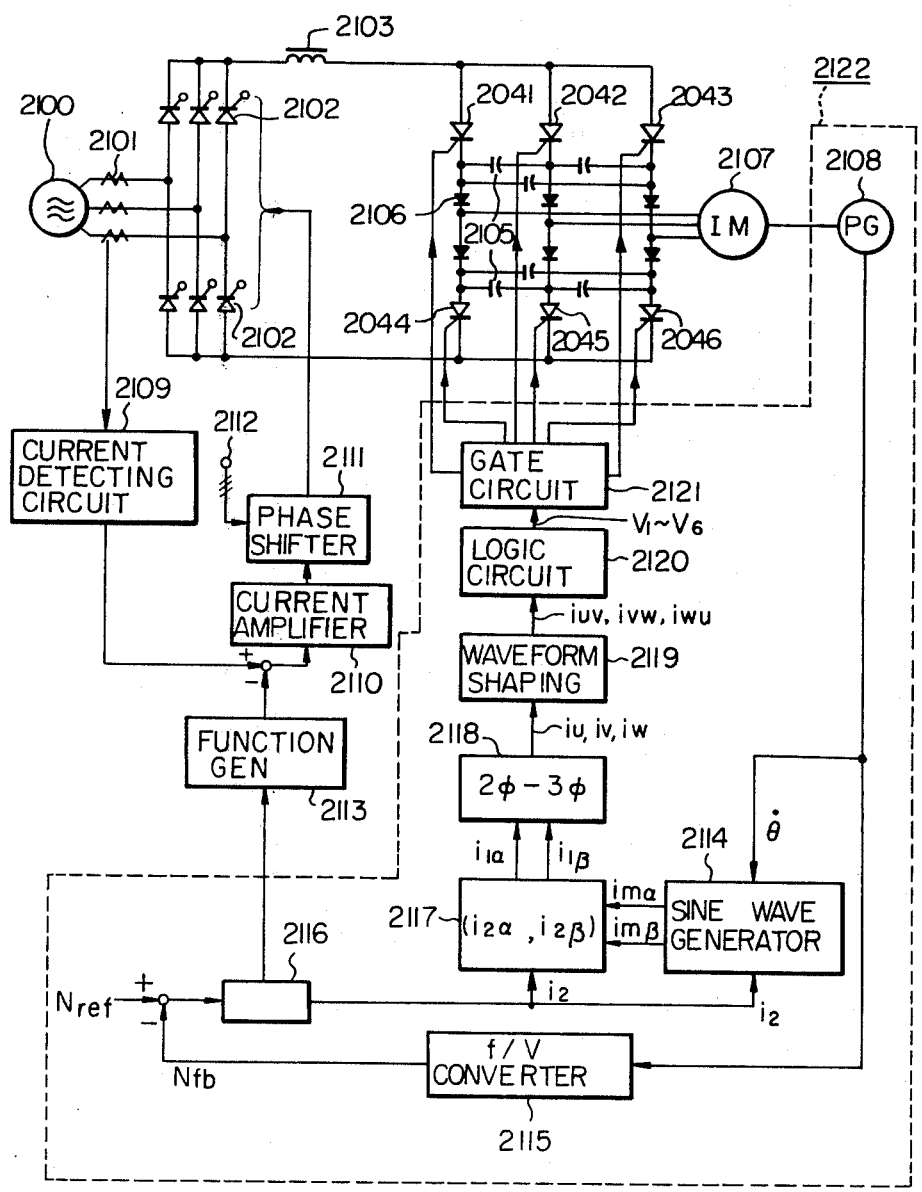
FIG. 22 is a block diagram showing a fifth embodiment of the invention.

In FIG. 22, a circuit 2122 for generating distribution signals to the thyrister gates in the embodiment is surrounded by the dotted line.

The motor rotation speed detecting device 2108 may be replaced by a DC tachometer generator or a resolver. A signal Nfb corresponding to a rotation speed is outputted by the frequency-to-voltage converter 2115. In the two-phase sine wave generator 2114, variable frequency two-phase sine wave signals $im\alpha$ and $im\beta$ corresponding to the motor's exciting current component are produced with the aid of a speed signal $\theta$ and a torque instruction signal $i_2$.

In the vector calculating circuit 2117, signals $i_{2\alpha}$ and $i_{2\beta}$ corresponding to the motor's secondary current component are calculated with the aid of the two-phase sine wave signals $im\alpha$ and $im\beta$ and the torque instruction $i_2$, and two-phase sine wave signal $i_{1\alpha}$ and $i_{1\beta}$ corresponding to the motor's primary current component can be obtained from the vector synthetic signals of the signals $i_{2\alpha}$ and $i_{2\beta}$ corresponding to the secondary current component and the aforementioned two-phase sine wave signals $im\alpha$ and $im\beta$. These sine wave signals $i_{1\alpha}$ and $i_{1\beta}$ are converted into 3-phase sine wave signals by the 2-phase-to-3-phase converter (which may be a 2-phase-to-polyphase converter). The three-phase sine wave signals are applied to the waveform shaping circuit 2119, where they are converted into square waves, which are applied to the logic circuit 2120. As a result, distribution signals to the thyristor gates of 120° electricity application are produced. After being amplified by the gate circuit 212, the distribution signals are distributed to the respective thyristors 2041 through 2046.

In the function generator 2113, the square root of the sum of the square of the secondary current component $i_2$ and the square of the exciting current component, that is, a signal corresponding to the primary component amplitude is delivered out, to control the main circuit DC current amplitude to be constant.

Figure 22A:
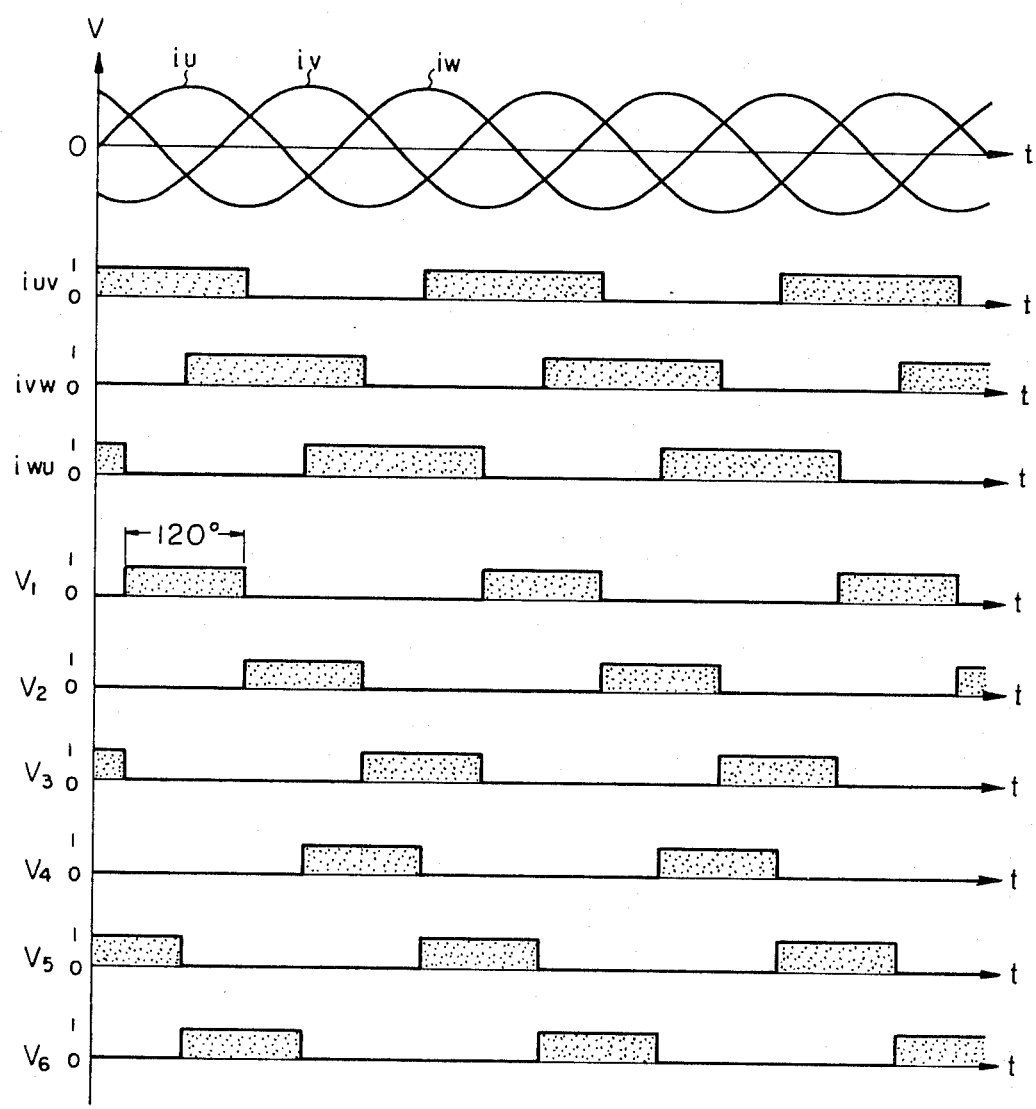
FIG. 22a is a time chart for a description of the fifth embodiment of the invention.

FIG. 22a is a time chart for a description of signals in various sections in the circuit, in which V is the voltage, t is the time, iu, iv and iw are the outputs of the 2-phase-to-3-phase converter 2118, and iuv, ivw and iwu are the output signals of the waveform shaping circuit 2119. For instance, output signal iuv is provided when iu>iv as a result of their comparison. The same thing can be said to the other output signals ivw and iwu. In FIG. 22a, $V_1$ through $V_6$ are the output signals of the logic circuit 2120, and the time at which each square wave output is provided corresponds to 120° in electrical angle. For instance, the output signal $V_1$ is obtained from the logical product of the output signal iuv and the NOT logic signal iwu of the output signal of iwu. This can be applied to the other output signals $V_2$ through $V_6$. These output signals $V_1$ through $V_6$ are amplified by the gate circuit 2121, and are applied to the gates of the thyristors 2041 through 2046, respectively.

FIG. 23 is a diagram for a description of the phase control according to the invention. In FIG. 23, reference characters ivo and ivl designate one-phase current waveforms of the motor primary current under no load condition and load condition, respectively. As is apparent from FIG. 23, when the no load condition is shifted to the load condition, the primary current iuL leads the primary current iuo by $\phi$ in phase. In this connection, the distribution output signals from the logical circuit 2120 are, for instance, signals $V_{10}$ and $V_{40}$ during the no load operation; however, during the load operation they are advanced by $\phi$ to become signals $V_{1L}$ and $V_{4L}$, respectively.

When the load is abruptly changed, in the conventional method, the primary current phase remains as it is, and the exciting inductance is greater than the primary or secondary leakage inductance, and therefore it is impossible to quickly increase the primary current. In this case, the secondary current component and the exciting current component are small, and therefore the generated torque is small. Accordingly, the transient response characteristic is lowered.

In the vector control system, where the exciting current component is constant and the no load condition is shifted to the load condition, the motor primary current phase $\phi$ is changed in a moment and the secondary current component is increased. Therefore, the primary current instruction of the steady load condition can be effected instantaneously, and accordingly the transient response is improved.

When the no load condition is abruptly shifted into the load condition, the rotation speed difference component is applied to the speed amplifier 2116, as a result of which the secondary current instruction signal $K_0i_2$ corresponding to the difference component is delivered out. If it is considered that the exciting current component is constant, the primary current instruction is given as the vector sum of the exciting current component and the secondary current component, and therefore, the phases of the signals $i_{1\alpha}$ and $i_{1\beta}$ of the vector calculating circuit 2117 are changed in accordance with the magnitude of the secondary current instruction. Accordingly, the phase of the distribution output signal is abruptly changed by $\phi$.

As is apparent from the above description, according to this invention, even when the load changes abruptly, the secondary current instruction is changed following the load change. That is, the primary current phase can be instructed transiently, and therefore the motor's transient response characteristic can be improved.

What is claimed is:

1. A control device of an induction motor, which comprises: a pulse generator (1802) coupled to said motor (1); a difference counter (1804) for counting the difference between an output (Nfb) of said pulse generator (1802) and a speed instruction value (Nref); a circuit (1805) for obtaining a slip frequency in accordance with contents of said difference counter (1804); a waveform generator (1806) for generating two-phase sine waves having a predetermined frequency from the output (Nfb) of said pulse generator (1802) and said slip frequency; and digital-to-analog converters (1807 and 1808) in which the contents of said difference counter (1804) are multiplied by outputs of said waveform generators (1806), so that the outputs of said waveform generator (1806) are employed as a stator exciting current component, while the outputs of said digital-to-analog converters (1807 and 1808) are employed as a torque current component, and the phases of said motor (1) are energized on the basis of a synthetic value of said two components.

2. A control device as claimed in claim 1, in which said waveform generator (1806) is made up of a beat oscillator operating on the sum of said slip frequency and a motor rotation frequency.

3. A control device as claimed in claim 1, in which said waveform generator (1806) comprises a memory circuit in which waveforms have been stored in advance.

4. A control device in an induction motor having a setting circuit of a rotating speed N; a detection circuit (107) for detecting an actual value of rotation speed; a circuit (108) for generating a current instruction according to a difference between a set value provided by said setting circuit and an actual value detected by said detection circuit (107); a circuit for calculating data corresponding to a slip frequency in response to said current instruction; a circuit (112') for obtaining a frequency instruction from the sum of said actual value and said slip frequency corresponding data; a variable frequency generating circuit (101) for generating a variable frequency alternate current in accordance with said frequency instruction; and circuits (113' and 114') for obtaining an effective current and a reactive current from an output of said variable frequency generating circuit and said current instruction for every phase and adding said effective current and reactive current for every phase, so that the winding of each phase is excited directly or through a phase number changing circuit according to the results of addition; which comprises: a frequency division circuit for delivering a frequency division signal according to the number of poles of a resolver coupled to the rotation shaft of said induction motor (101) and the number of poles of said induction motor; a torque instruction circuit for outputting a signal which is digital-phase-modulated by a torque instruction which is to be provided by said induction motor (101) according to a load of said induction motor (101) and has the same carrier frequency as said frequency division signal; and a two-phase beat generator for receiving an output signal of said frequency division signal and an output signal of said torque instruction circuit to provide two-phase sine wave signals shifted in phase by 90° from each other.

* * * * *

UNITED STATES PATENT AND TRADEMARK OFFICE
CERTIFICATE OF CORRECTION

PATENT NO. : 4,259,628

DATED : March 31, 1981

INVENTOR(S) : TAKANOBU IWAKANE, ET AL.

It is certified that error appears in the above—identified patent and that said Letters Patent is hereby corrected as shown below:

Column 3, line 23, change "including" to --indicating--.

Column 3, line 32, change "a" to --the--.

Column 4, line 33, change "sin" to --cos--.

Column 7, line 54, change "since" to --sine--.

Column 7, line 57, change "$\Theta$" to --$\dot{\Theta}$--

Column 7, line 58, change "$\overline{\phi}$" to --$\dot{\phi}$--.

UNITED STATES PATENT AND TRADEMARK OFFICE
CERTIFICATE OF CORRECTION

PATENT NO. : 4,259,628

DATED : March 31, 1981

INVENTOR(S) : TAKANOBU IWAKANE, ET AL.

It is certified that error appears in the above—identified patent and that said Letters Patent is hereby corrected as shown below:

Column 9, line 55, change "408" to --403--.

Column 11, line 19, change "of" to --on--.

Column 12, line 16, after "is" insert --:--.

Column 13, line 36, "ent" should be --ence--.

Signed and Sealed this

Seventeenth Day of November 1981

[SEAL]

Attest:

GERALD J. MOSSINGHOFF

Attesting Officer    Commissioner of Patents and Trademarks